(12) United States Patent
Chew et al.

(10) Patent No.: US 11,055,043 B2
(45) Date of Patent: Jul. 6, 2021

(54) INFORMATION-PROCESSING DEVICE DETERMINING DISPLAY STYLE FOR DISPLAYING IDENTIFICATION INFORMATION

(71) Applicant: BROTHER KOGYO KABUSHIKI KAISHA, Nagoya (JP)

(72) Inventors: Po Chun Chew, Nagoya (JP); Koshi Fukazawa, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/003,321

(22) Filed: Aug. 26, 2020

(65) Prior Publication Data

US 2021/0096795 A1    Apr. 1, 2021

(30) Foreign Application Priority Data

Sep. 30, 2019    (JP) .............................. JP2019-179601

(51) Int. Cl.
| | |
|---|---|
| *G06F 15/00* | (2006.01) |
| *G06F 3/12* | (2006.01) |
| *G06K 1/00* | (2006.01) |
| *H04L 12/24* | (2006.01) |

(52) U.S. Cl.
CPC .......... *G06F 3/1253* (2013.01); *G06F 3/1204* (2013.01); *G06F 3/1205* (2013.01); *G06F 3/1231* (2013.01); *G06F 3/1232* (2013.01); *G06F 3/1292* (2013.01); *H04L 41/0806* (2013.01)

(58) Field of Classification Search
CPC .... G06F 3/1253; G06F 3/1204; G06F 3/1205; G06F 3/1231; G06F 3/1232; G06F 3/1292; H04L 41/0806
USPC .............................. 358/1.15, 1.1, 1.13, 1.14
See application file for complete search history.

(56) References Cited

U.S. PATENT DOCUMENTS

| | | | | |
|---|---|---|---|---|
| 2012/0140263 | A1* | 6/2012 | Oba ....................... | G06F 3/1292 358/1.14 |
| 2019/0361644 | A1* | 11/2019 | Nagasawa ............. | G06F 3/1222 |
| 2020/0042262 | A1* | 2/2020 | Harigae ............. | H04N 1/00307 |

FOREIGN PATENT DOCUMENTS

| | | |
|---|---|---|
| JP | 2004-215164 A | 7/2004 |
| JP | 2013-105361 A | 5/2013 |

* cited by examiner

*Primary Examiner* — Douglas Q Tran
(74) *Attorney, Agent, or Firm* — Kenealy Vaidya LLP

(57) ABSTRACT

In an information-processing device, a controller executes a storage process to store a command program in the memory, and an acquisition process to acquire a plurality of pieces of identification information identifying respective ones of a plurality of devices detected by the wireless communication interface. The controller executes a determination process to determine a display style according to prescribed criteria for each of the plurality of pieces of identification information, and a display process to display on the display the plurality of pieces of identification information in respective ones of the plurality of display styles, and a setup process in response to receiving selection of at least a piece of identification information via the user interface. The setup process is to enable the command program to output commands to a device identified by each of the selected at least a piece of identification information via the wireless communication interface.

25 Claims, 12 Drawing Sheets

INFORMATION-PROCESSING DEVICE DETERMINING DISPLAY STYLE FOR DISPLAYING IDENTIFICATION INFORMATION

CROSS REFERENCE TO RELATED APPLICATION

This application claims priority from Japanese Patent Application No. 2019-179601 filed Sep. 30, 2019. The entire content of the priority application is incorporated herein by reference.

TECHNICAL FIELD

The present disclosure relates to a program and an information-processing device.

BACKGROUND

There are known printers receiving print commands from a personal computer (PC) through wireless communication conforming to a near field communication standard such as Bluetooth (registered trademark). In order for the PC to output print commands to the printer, a setup program sets up a command program that supports the printer (for example, a device driver) on the PC.

SUMMARY

However, a user must perform troublesome tasks to set up the command program used for wireless communication.

In view of the foregoing, it is an object of the disclosure to provide an information-processing device or a program that enables a user to set up a command program used for wireless communication more easily.

In order to attain the above and other objects, the disclosure provides a non-transitory computer readable storage medium storing a set of program instructions installed on and executed by an information-processing device having a wireless communication interface, a user interface, a display, a controller, and a memory. The memory stores an OS configured to execute a pairing process to establish a relationship between the OS and an external device for wireless communications via the wireless communication interface. The set of program instructions includes: executing a storage process to store a command program in the memory; executing an acquisition process to acquire a plurality of pieces of identification information identifying respective ones of a plurality of devices detected by the wireless communication interface, each piece of identification information being classified into one of a plurality of types; executing a determination process to determine a display style among a plurality of display styles different from one another according to prescribed criteria for each of the plurality of pieces of identification information, each display style defining a manner to display the corresponding piece of identification information on the display for representing a type of the corresponding piece of identification information; executing a display process to display on the display the plurality of pieces of identification information in respective ones of the plurality of display styles determined therefor, and executing a setup process in response to receiving selection of at least a piece of identification information via the user interface from among the plurality of pieces of identification information displayed, the setup process being to enable the command program to output commands to a device identified by each of the selected at least a piece of identification information via the wireless communication interface.

According to another aspect, the disclosure provides a non-transitory computer readable storage medium storing a set of program instructions installed on and executed by an information-processing device having a wireless communication interface, a user interface, a controller, and a memory. The memory stores an OS configured to execute a pairing process to establish a relationship between the OS and an external device for wireless communications via the wireless communication interface. The set of program instructions includes: executing a storage process to store a command program in the memory; executing an acquisition process to acquire a piece of identification information and status information, the piece of identification information identifying a device, the status information indicating either one of a first status of a device identified by the piece of identification information and a second status of the device, the second status being different from the first status; executing a determination process to determine whether the status information indicates the first status or the second status; executing a setup process according to a first method in a case where the status information indicates the first status, the setup process being to enable the command program to output commands via the wireless communication interface to the device identified by the piece of identification information; and executing a setup process according to a second method different from the first method in a case where the status information indicates the second status.

According to still another aspect, the disclosure provides an information-processing device. The information-processing device includes a wireless communication interface, a user interface, a display, a memory, and a controller. The memory stores an OS configured to execute a pairing process to establish a relationship between the OS and an external device for wireless communications via the wireless communication interface. The controller is configured to execute: a storage process to store a command program in the memory; an acquisition process to acquire a plurality of pieces of identification information identifying respective ones of a plurality of devices detected by the wireless communication interface, each piece of identification information being classified into one of a plurality of types; a determination process to determine a display style among a plurality of display styles different from one another according to prescribed criteria for each of the plurality of pieces of identification information, each display style defining a manner to display the corresponding piece of identification information on the display for representing a type of the corresponding piece of identification information; a display process to display on the display the plurality of pieces of identification information in respective ones of the plurality of display styles determined therefor; and a setup process in response to receiving selection of at least a piece of identification information via the user interface from among the plurality of pieces of identification information displayed, the setup process being to enable the command program to output commands to a device identified by each of the selected at least a piece of identification information via the wireless communication interface.

According to still another aspect, the disclosure provides an information-processing device. The information-processing device includes a wireless communication interface, a user interface, a memory, and a controller. The memory stores an OS configured to execute a pairing process to establish a relationship between the OS and an external device for wireless communications via the wireless communication interface. The controller is configured to execute: a storage process to store a command program in the memory; an acquisition process to acquire a piece of identification information and status information, the piece of identification information identifying a device, the status information indicating either one of a first status of a device identified by the piece of identification information and a second status of the device, the second status being different from the first status; a determination process to determine whether the status information indicates the first status or the second status; a setup process according to a first method in a case where the status information indicates the first status, the setup process being to enable the command program to output commands via the wireless communication interface to the device identified by the piece of identification information; and a setup process according to a second method different from the first method in a case where the status information indicates the second status.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1A:
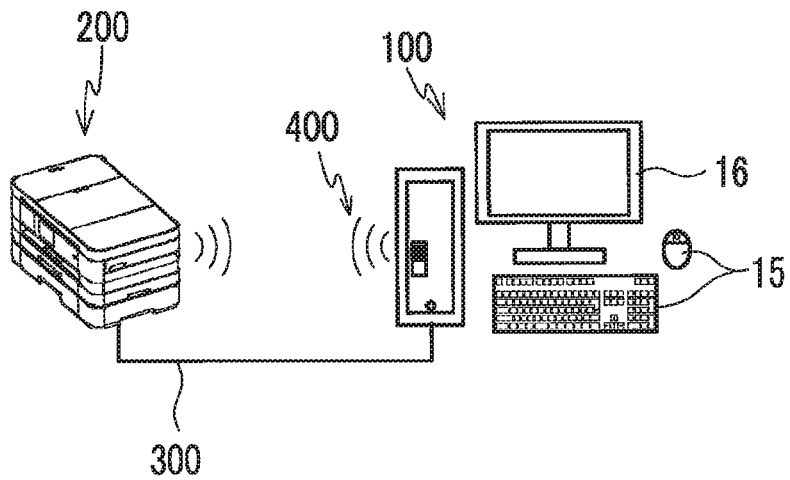
FIG. 1(A) is a schematic diagram illustrating an information-processing device according to an embodiment and a printer.

A conventional setup program as described in the background section of the present disclosure sets up a device driver on a personal computer (PC). However, for setting up the device driver the user must perform troublesome operations by using a user interface.

Specifically, in the course of the setup operation, an OS of an information-processing device displays a list of pieces of wireless identification information (hereinafter, simply referred to as "pieces of identification information") on a display. Here, each piece of identification information is for identifying a printer capable of performing wireless communication with the information-processing device according to a near field communication standard such as Bluetooth (registered trademark). This list shows the pieces of identification information for all devices including printers and other devices provided that the devices can communicate with the information-processing device according to the Bluetooth. Thus, the user cannot quickly specify a piece of identification information identifying a printer target for the setup operation. Particularly in some types or versions of OS, the list shows pieces of identification information for not only devices according to Bluetooth but also devices in conformance with other wireless communication standards. In such cases, the user cannot easily specify the piece of identification information for the target printer.

It is necessary for completing setup properly that a pairing process between the OS and the printer has been completed. In the course of setup, before executing the pairing process, the OS displays pieces of identification information identifying unpaired devices, with which the OS does not execute the pairing process, without requiring user operation through a user interface. On the other hand, in some cases, the user wishes to execute the setup for the printer which has completed the pairing process with the OS. In such cases, the user must perform troublesome operations in order to make the OS display a list showing pieces of identification information identifying the paired printers which have completed the pairing process with the OS.

In view of the foregoing, it is an object of a present embodiment to provide an information-processing device or a program that enables a user to set up a command program more easily.

The embodiment according to the disclosure will be described while referring to the drawings. While the disclosure has been described in detail with reference to the above embodiments, it would be apparent to those skilled in the art that various changes and modifications may be made thereto. For example, an order of processes described below may be modified without changing a scope of the concept of the disclosure.

As shown in FIG. 1(A), an information-processing device 100 and a printer 200 can wirelessly communicate with each other via a wireless communication link 400. The printer 200 may be a multifunction peripheral having various functions such as a print function, a facsimile function, and a copy function. The wireless communication link 400 is established according to Bluetooth that is a wireless communication standard (hereafter, referred to as "BT"). Bluetooth is standardized by the IEEE as IEEE 802.15.1. The information-processing device 100 and the printer 200 perform wireless communications according to BT via the wireless communication link 400.

The information-processing device 100 and the printer 200 can also communicate with each other via a communication cable 300. The communication cable 300 is a cable conforming to the Universal Serial Bus (USB; registered trademark) standard. The information-processing device 100 and the printer 200 perform wired communication via the communication cable 300 according to the USB standard.

In the following description, BT devices indicate devices conforming to the BT, and USB devices indicate devices conforming to the USB. The printer 200 functions as both of a BT device and a USB device. The information-processing device 100 functions as a central or master of the BT, and also functions as a USB host.

After a printer driver 18C has been set up, the information-processing device 100 outputs various commands to the printer 200 via the communication link 400. Hereinafter, the printer 200 for which the information-processing device 100 has set up the printer driver 18C will be referred to as "the setup completed printer 200". The commands are types of information described later and include print commands. The print command includes image data or designating information for designating image data (URL). The image data represents a target image to be printed by the setup completed printer 200. The print commands are received by the setup completed printer 200 via the wireless communication link 400. In response to the print command received, the setup completed printer 200 prints the image based on the image data on a sheet, and discharges the printed sheet outside.

After the printer driver 18C is set up, the information-processing device 100 can also transmit various commands to the communication cable 300. In a case where the setup completed printer 200 receives the print command via the communication cable 300, the setup completed printer 200 prints the image based on the image data included in the print command on a sheet.

Figure 1B:
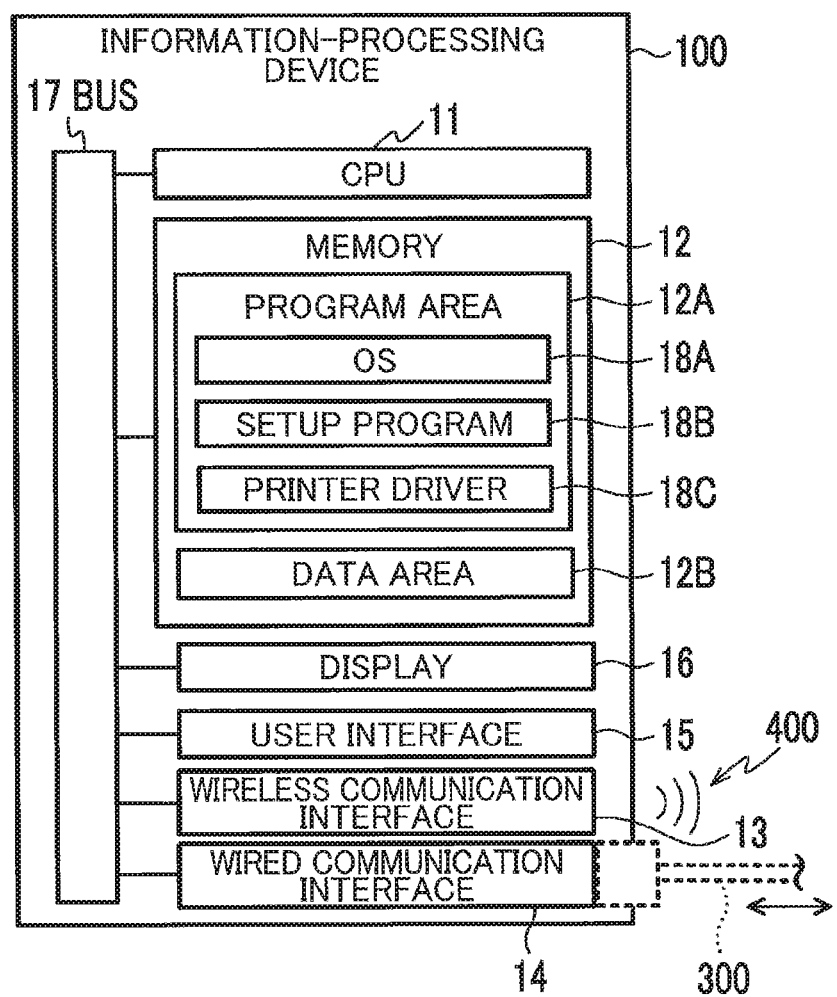
FIG. 1(B) is a block diagram illustrating an internal structure of the information-processing device according to the embodiment.

The information-processing device 100 will be described in detail while referring to FIG. 1(B). The information-processing device 100 includes a CPU 11, a memory 12, a wireless communication interface 13, a wired communication interface 14, a user interface 15, and a display 16.

The CPU 11 reads various programs stored in the memory 12 so as to integrally control operations of the information-processing device 100. The CPU 11 is an example of the computer.

The memory 12 is a storage medium such as a ROM, a RAM, and an EEPROM, and a buffer provided in the CPU 11. The storage medium is a non-transitory, tangible medium. Note that electric signals conveyed along a transmission path, such as the Internet, are one type of a computer-readable storage medium, but are not a non-transitory, tangible storage medium.

The memory 12 has a program area 12A and a data area 12B. The program area 12A is for storing various programs including an OS 18A, a setup program 18B, and a printer driver 18C. Hereinafter, the setup program 18B is simply referred to as "the program 18B, and the printer driver 18C is simply referred to as "the driver 18C". The program 18B and the driver 18C are respectively examples of a program and a command program. The programs stored in the memory 12 may include application programs (not shown) other than the program 18B and the driver 18C.

The OS 18A is a basic program of the information-processing device 100.

The program 18B is a single program or an aggregation of a plurality of program modules. The program 18B is commonly called as an "installer". The program 18 is a so-called integrated installer. The program 18B as the integrated installer includes a plurality of drivers 18C. Here, each driver 18C supports one or more predetermined models or types of printers 200. The program 18B executed by the CPU 11 stores the plurality of drivers 18C, which are originally included in the program 18B, in the program area 12A. That is, the plurality of drivers 18C is stores in the program area 12A separately from the program 18B. Subsequently, the program 18B sets up one or more drivers 18C supporting the model of the printer 200 based on the user operation.

The program 18B may not be the integrated installer. In this case, the program 18B includes a driver 18C supporting single predetermined model of printers 200.

Figure 3A:
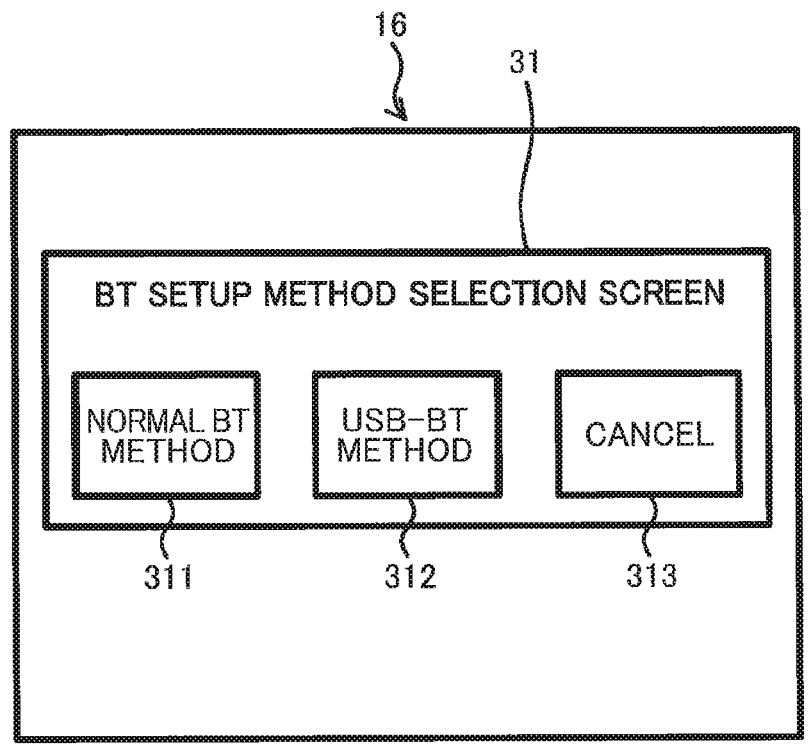
FIG. 3(A) is an explanatory diagram illustrating a BT setup method selection screen.

During execution of the program 18B, various information and data are exchanged between the OS 18A and the program 18B. Specifically, the program 18B generates or obtains display data representing a screen to be displayed on the display 16, and outputs the generated or obtained display data to the OS 18A. The OS 18A displays the screen represented by the generated or obtained display data on the display 16. FIG. 3(A) shows a BT setup method selection screen 31 as an example of such a screen. As described above, the program 18B displays various screens on the display 16 through the OS 18A.

After the driver 18C has been set up, various information and data are exchanged between the OS 18A and the driver 18C. Specifically, the driver 18C can output to the OS 18A the various information and data which are to be transmitted to the setup completed printer 200 that the driver 18C supports.

The driver 18C may not output the various information and data to the OS 18A, but may be configured to output the various information and data directly to the wireless communication interface 13 or the wired communication interface 14. That is, the driver 18C is a program that enables the information-processing device 100 to transmit various commands to the model of the printers 200 supported by the driver 18C.

The data area 12B is for storing various information and data used by various programs.

The wireless communication interface 13 transmits various information and data outputted from the OS 18A to the wireless communication link 400 in accordance with the BT. The wireless communication interface 13 receives various information and data transmitted from BT devices existing around the information-processing device 100 (hereinafter, referred to as "the peripheral BT devices"). The wireless communication interface 13 outputs the received various information and data to the OS 18A. The OS 18A is configured to perform a pairing process according to the BT with the peripheral BT devices by using wireless communications via the wireless communication interface 13 for establishing a relationship with the peripheral BT device.

The wireless communication interface 13 transmits various information and data outputted from the driver 18C to the wireless communication link 400. The wireless communication interface 13 receives various information and data transmitted from the peripheral BT devices, and outputs the receives various information and data to the driver 18C.

The wired communication interface 14 has one or more USB connectors (not shown). The communication cable 300 has a first plug (not shown) at one end thereof and a second plug at another end thereof. The first plug can be inserted into the USB connector of the wired communication interface 14. The second plug can be inserted into a USB connector (not shown) provided in the USB device. The wired communication interface 14 transfers various information and data from the OS 18A to the communication cable 300 connected to the USB connector thereof in accordance with the USB standard. The wired communication interface 14 receives various information and data transferred from the USB device via the communication cable 300, and then outputs the various information and data to the OS 18A.

The wired communication interface 14 outputs signals specifying a prescribed voltage level in response to the communication cable 300 transitioning from a non-inserted state in the connector of the wired communication interface 14 to an inserted state.

The wired communication interface 14 transfers various information and data from the driver 18C to the communication cable 300. In this case, the wired communication interface 14 also receives various information and data transferred from the USB device via the communication cable 300, and then outputs the received various information and data to the driver 18C.

The user interface 15 accepts input operations by the user. The user interface 15 includes a keyboard and a mouse. The keyboard outputs operation information corresponding to keys operated by the user to the CPU 11. The mouse outputs position information indicating positions that the user has specified in a screen displayed on the display 16 to the OS 18A or the driver 18C executed by the CPU 11 via the OS 18A. Each of the program 18B and the driver 18C specifies the positions in the screen that the user has specified via the user interface 15 based on the position information, and uses the specified positions in various processes.

The user interface 15 may include other well-known input devices, such as a pen-type input device, in addition to or instead of the keyboard and mouse.

The CPU 11 performs the processes described below according to instructions in the programs. In the following description, actions such as "determine," "extract," "select," "calculate," "decide," "identify," "acquire," "receive," "control," "set," and the like represent processes performed by the CPU 11. Processes performed by the CPU 11 include processes that control hardware through a controller such as the OS 18A. Note that the term "acquire" in this specification is used as a concept that does not necessarily require a request. In other words, a process by which the CPU 11 receives data without requesting that data is included in the concept of "the CPU 11 acquires data." The term "data" described herein is expressed as bit strings that can be read by a computer. Data of different formats are treated as the same data when the content of the data is essentially the same. The same holds true for "information" in this specification. An "instruction," a "response," a "request," or the like is processed by communicating information indicating the "instruction," the "response," or the "request." The terms "instruction," "response," and "request" may also be used to describe information indicating an "instruction," a "response," or a "request."

A process executed by the CPU 11 according to instructions described in a program may be described using abbreviated expressions, such as "the CPU 11 executes," "the program 18B executes," and "the information-processing device 100 executes." Similarly, the input and output of information performed by the program 18B or the driver 18C via the wireless communication interface 13, the wired communication interface 14, or the user interface 15 may be described in abbreviated terms, such as "the CPU 11 receives," "the program 18B transmits," or "the information-processing device 100 acquires."

Further, a process performed by the CPU 11 to determine whether information A indicates circumstance B may be described conceptually as "determining whether circumstance B based on information A." A process in which the CPU 11 determines whether information A indicates circumstance B or circumstance C may be described conceptually as "determining whether circumstance B or circumstance C based on information A."

The terms "data" and "information" used in this specification share aspects of being bits orbit strings that computers can handle. The computer treats "data" without considering the significance of its individual bits. In the case of "information," on the other hand, the computer's operations branch based on the significance of the individual bits. Additionally, a "command" is a control signal prompting the destination device to perform the next operation. A command may include information and may itself possess the properties of information.

Further, "data" and "information" are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between "data" and "information" is not strictly enforced; exceptions to the rule may be allowed. For example, data may be temporarily treated as information, while information may be temporarily treated as data. Further, certain bits or bit strings may be treated as data on one device and information on another. Further, information may be extracted from data, and data may be extracted from information.

Further, the phrase "in response to" in this specification indicates that the process specified before the phrase is to be executed when the condition specified after the phrase has been met. Note that the timing at which the process is executed should be after the condition has been met, but need not be immediately after the condition is met.

Next, the process implemented by the program 18B of the embodiment will be described with reference to FIGS. 1 through 7.

The program 18B is started in response to an operation that the user performs through the user interface 15 (hereinafter simply called a "user operation"). However, the program 18B may be started in response to a command received from the OS 18A or another application program.

Figure 2:
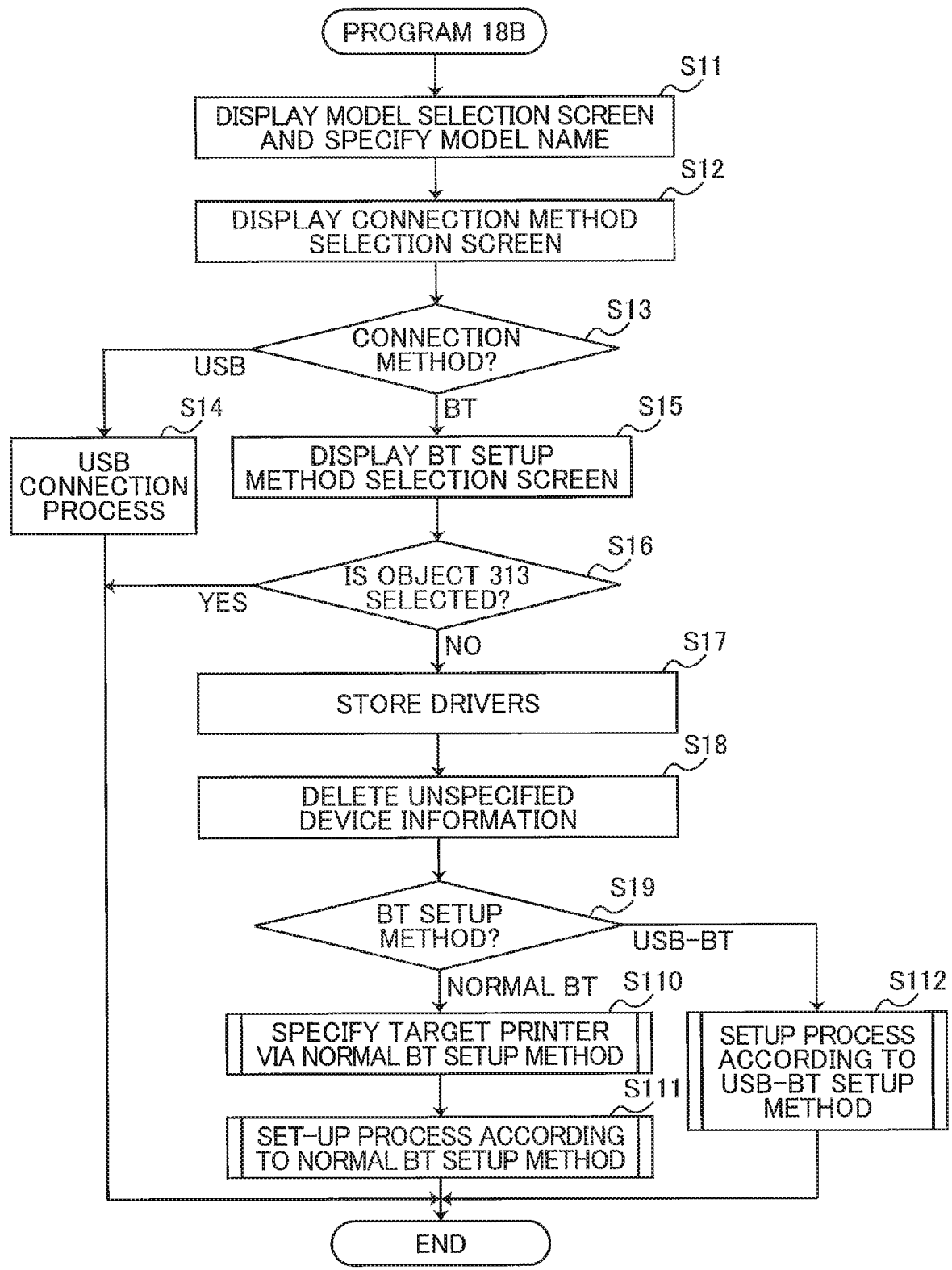
FIG. 2 is a flowchart illustrating a process executed by a setup program.

In S11 of FIG. 2 the started program 18B displays a model selection screen on the display 16. The model selection screen includes one or more model names of printers 200 as candidates for a target printer 200 to be set up, whereby the user can identify the printers 200 from the displayed model names. Each model name is an object selectable through user operations. While the model selection screen is displayed, the user selects one or more model names displayed on the model selection screen as the target printer 200 to be set up. Further, in S11 the program 18B specifies the selected model name through the user operations.

In S12 the program 18B displays a connection method selection screen on the display 16. The connection method selection screen includes character strings as options indicating connection methods by which the information-processing device 100 and the printer 200 can be connected and communicated with each other to transmit print commands after setup is completed. The connection methods include at least wireless connection according to the BT and wired connection according to the USB. The displayed character strings are objects selectable through user operations.

In S13 the program 18B receives user operations for selecting a connection method. In a case where the selected connection method is the wired connection according to the USB (S13, USB), the process goes to S14. In a case where the selected connection method is the wireless connection according to the BT, the process goes to S15.

In S14 the program 18B executes a USB connection process. Specifically, the program 18B stores a driver 18C supporting each model name specified in S11 in the program area 12A. Further, in S14, the program 18B sets up the stored driver 18C so that the information-processing device 100 can transmit various commands to the printer 200 through the communication cable 300. Since the process of S14 is well known in the art, a detailed description will not be provided. After executing S14, the program 18B ends the process in FIG. 2.

The driver 18C supporting the model name specified in S11 is not only the driver that is set up through the processes from S15. Thus, instead of executing S11 prior to the process of S12, the process of S11 may be executed before the process S14 and after USB is selected in the process S13.

Through the processes from S15, the program 18B executes a setup process of the driver 18C (hereinafter, referred to as "the BT setup") enabling the information-processing device 100 to transmit various commands to the printer 200 via the wireless communication link 400. The BT setup includes a normal BT setup method and a USB-BT setup method. The normal BT setup method includes the process of S110. The USB-BT setup method includes the process of S112. The normal BT setup is one example of a setup method without using the wired communication interface 14. The USB-BT setup method is one example of a setup method using the wired communication interface 14.

In S15 the program 18B displays the BT setup method selection screen 31 (FIG. 3(A)) on the display 16. The BT setup method selection screen 31 includes a plurality of selection objects 311-313 which can be selected through user operations. The selection object 311 includes a character string "normal BT method" indicating the normal BT setup method. The selection object 312 includes a character string "USB-BT method" indicating the USB-BT setup method. The selection object 313 includes a character string "cancel" for cancelling the BT setup. The process of S15 is an example of the first display screen. The normal BT setup method ("normal BT method") is an example of the first option. The USB-BT setup method ("USB-BT method") is an example of the second option.

The program 18B receives user operations through the displayed BT setup method selection screen 31 while the BT setup method selection screen 31 is displayed. When the selection object 313 ("cancel") is selected through the user operations (S16: YES), the BT setup is cancelled and the program 18B ends the process shown in FIG. 2. On the other hand, when one of the selection objects 311 and 312 is selected through the user operations (S16: NO), the programs 18B executes S17.

In S17 the program 18B stores all the drivers 18C included in the program 18B in the program area 12A. The process of S17 is an example of the storage process.

In S18 the program 18B deletes unspecified device information from the data area 12B. The unspecified device information will be described as follows. In a case where the printer 200 is connected to the wired communication interface 14 through the wired connection, the OS 18A executes a well-known plug and play process (hereinafter, referred to as "the normal PnP process") with the connected printer 200. The normal PnP process is executed when the printer 200 establishes the wired connection with the wired communication interface 14 even in a state where no driver supporting this wire-connected printer 200 is stored in the program area 12A. However, in a case where no driver supporting the printer 200 is stored in the program area 12A, the OS 18A stores unspecified device information indicating that the printer 200 is an unknown device in the data area 12B. Once the unspecified device information is stored in the data area 12B, the OS 18A does not assign a print queue to the driver 18C supporting the printer 200 even if the printer 200 establishes wired connection with the printer 200 under a state where the driver 18C supporting the printer 200 is stored in the program area 12A.

In the embodiment, the OS 18A assigns a wired communication queue to the driver 18C through the PnP process with the target printer 200, and this wired communication queue is used in the BT setup according to the USB-BT setup method as described in S112 of FIG. 2. Once the target printer 200 establishes the wired connection with the wired communication interface 14 before starting the process shown in FIG. 2 under a state where the driver 18C supporting the target printer 200 does not stored in the program area 12A, unspecified device information indicating that the target printer 200 is unknown device is stored in the data area 12B. In this case, the driver 18C cannot be assigned with the wired communication queue if the target printer 200 establishes wired connection with the wired communication interface 14 in S112. Further, if in S112 the OS 18A sets up an HCRP driver which is a standard driver included in the OS 18A, the OS 18A executes a forced PnP process. The same problem about the unspecified device information arises in this case. Thus, in S18 the program 18B deletes all the unspecified device information related to the printer registered in the data area 12B.

The normal PnP process is a PnP process executed by the OS 18A and triggered by the signal (described above) from the USB connector provided in the wired communication interface 14 transitioning to the prescribed voltage level. The forced PnP process is different from the normal PnP process in that the forced PnP process is executed spontaneously by the OS 18A.

In the embodiment, the program 18B deletes the unspecified device information. However, the program 18B may output a deletion command to delete the unspecified device information to the OS 18A. In this case, in response to the deletion command received, the OS 18A deletes all the unspecified device information related to the printer from the data area 12B.

The process shifts to S19 after S18. In S19 the program 18B determines whether the BT setup method is the normal BT setup method or the USB-BT setup method. When the user operations select the selection object 311 in the BT setup method selection screen 31, the program 18B determines that the normal BT setup method is selected (S19, NORMAL BT), and executes S110. On the other hand, when the user operations select the selection object 312, the program 18B determines that the USB-BT setup method is selected (S19: USB-BT), and executes S112.

Figure 4:
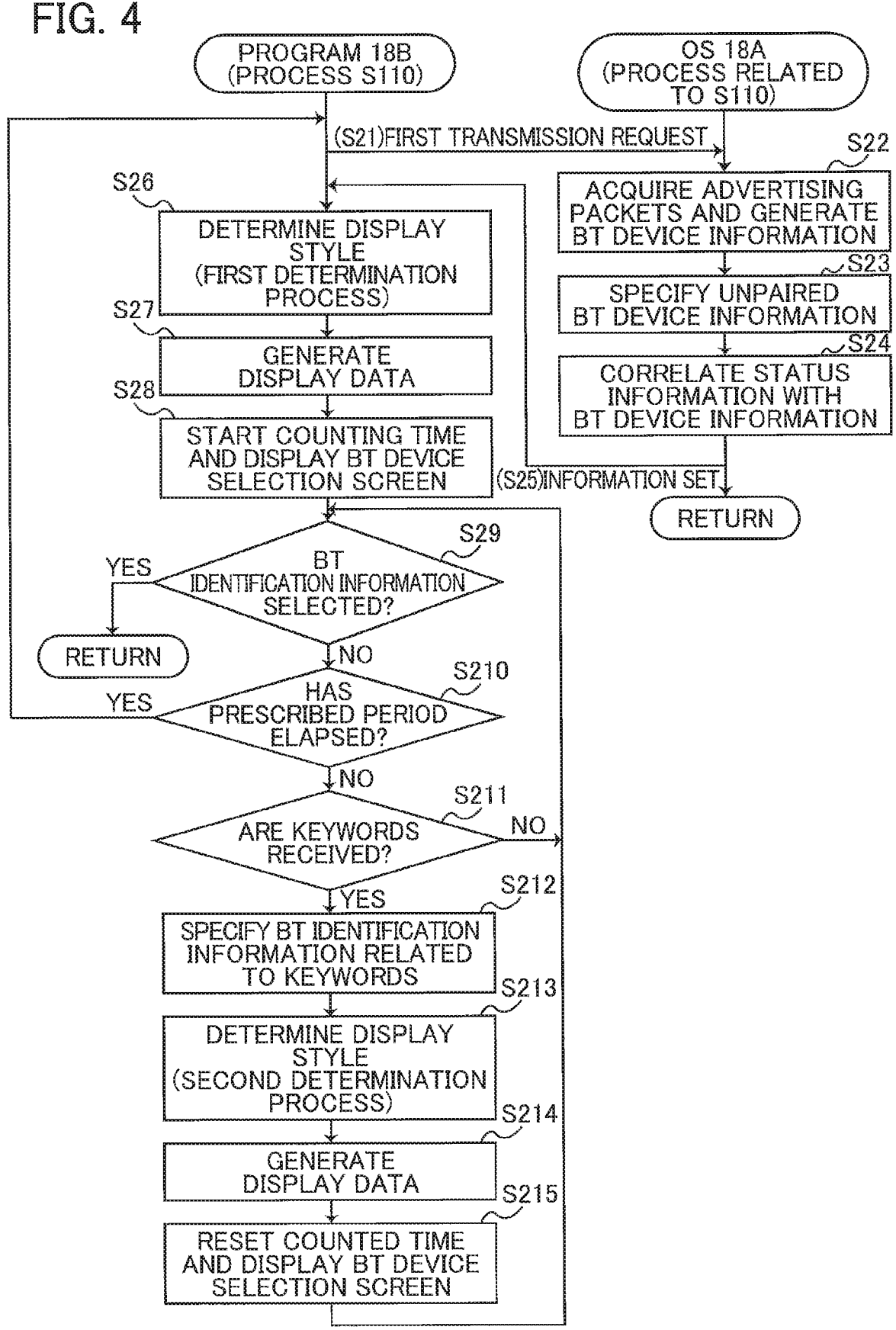
FIG. 4 is a flowchart illustrating step S110 shown in FIG. 2 in detail.

In S110 the program 18B executes a process for specifying a target printer 200 via the normal BT setup method. The target printer 200 is also a target of the process of S111 described later. FIG. 4 is a flowchart illustrating detailed steps in S110.

As shown in FIG. 4, in S21 the program 18B outputs a first transmission request to the OS 18A. The first transmission request is information for requesting the OS 18A to transmit each piece of candidate BT device information. The piece of candidate BT device information is a piece of BT device information indicating a device candidate for the target printer 200 (hereinafter, referred to as "the candidate printer 200").

Before the piece of BT device information is described in detail, the pairing process according to the general BT will be described. Each BT device transmits advertising packets to devices thereround. Each advertising packet includes a piece of BT identification information included in and identifying the BT device that transmitted the packet, and a BT device name of the BT device. The piece of BT identification information is for identifying the BT device in wireless communication according to the BT, and is called as a BD address. The piece of BT identification information is an example of the piece of identification information and the wireless identification information. The BT device name is a name of the BT device and is mainly used for the display in the BT central (for example, the information-processing device 100) which is the receiving end of the advertising packet. The BT standard defines a plurality of profiles defining operations of the BT devices. The advertising packet further includes at least one piece of profile information indicating a profile supported by the BT device of the transmission source.

In the embodiment, an advertising packet transmitted from the printer 200 is referred to as "the specific advertising packet". A piece of BT identification information included in the specific advertising packet is referred to as "the piece of specific BT information". When the printer 200 is shipped, the piece of specific BT information may include specific model information identifying a model of the printer 200 whose driver 18C the program 18B can set up (hereinafter, referred to as "the specific model information"). The specific model information may be a character string identifying the model of the printer 200, such as a model name or a part of model name, for example. The specific BT identification information can be modified by user operations, and thus the specific BT identification information may not contain any specific model information, at the time of wireless communication. The specific advertising packet includes at least one of HCRP (Hard Copy Cable Replacement Profile) and SPP (Serial Port Profile).

In response to user operations, the OS 18A acquires advertising packets transmitted from the BT devices around the information-processing device 100 by using the wireless communication interface 13. The OS 18A displays a BT device name included in each acquired advertising packet on the display 16. When one BT device name is selected through user operations, the OS 18A executes a pairing process with the BT device identified by the selected BT device name. Through the pairing process, the OS 18A registers in the data area 12B a piece of paired BT device information for indicating the BT device that has completed the pairing process with the information-processing device 100. The piece of paired BT device information includes the BT device name, the piece of BT identification information, the profile, and an encryption key to be used in wireless communications. Further, in a case where the advertising packet is the specific advertising packet transmitted from the printer 200, the OS 18A creates a wireless communication queue for this printer 200 in the data area 12B, and registers first correlation information in the piece of paired BT device information. Here, the first correlation information is for correlating the created wireless communication queue with the piece of BT identification information included in the acquired advertising packet. The wireless communication queue is a print queue used when the information-processing device 100 transmits various commands (mainly print commands) to the printer 200 identified by the piece of BT identification information correlated in the correlation information via the wireless communication link 400 after completion of setting up the driver 18C. This is a description of the pairing process according to the general BT.

In response to the first transmission request received in S21, that is, in response to the request from the program 18B, in S22 the OS 18A executes an acquisition process for acquiring advertising packets from the peripheral BT devices. Specifically, the wireless communication interface 13 detects and acquires advertising packets transmitted from peripheral BT devices. In other words, the wireless communication interface 13 detects the peripheral BT devices. The OS 18A acquires all the advertising packets detected and acquired by the wireless communication interface 13. Further, the OS 18A generates a piece of BT device information and registers the generated piece of BT device information in the data area 12B for each detected peripheral BT device. Each piece of BT device information includes a piece of BT identification information included in a corresponding advertising packet, a BT device name, and a profile which are included in an acquired advertising packet.

In S23 the OS 18A specifies pieces of unpaired BT device information from among the pieces of BT device information generated in S22 on the basis of the pieces of paired BT device information registered in the data area 12B. Specifically, from among the pieces of BT device information generated in S22, the OS 18A specifies the piece of BT device information including the piece of BT identification information that does not match a piece of BT identification information included in any piece of paired BT device information, as a piece of unpaired BT device information.

In S24 the OS 18A correlates status information with each of the pieces of paired BT device information and pieces of unpaired BT device information.

Specifically, the status information is either one of predetermined first status information and predetermined second status information. The first status information indicates that the pairing process has been completed or the pairing is established. The second status information indicates that the pairing process has not been completed, or the pairing is not established. The OS 18A correlates the first status information to each piece of paired BT device information. Accordingly, the OS 18A generates, as an information set, a first information set including the piece of paired BT device information and the first status information. Here, the piece of paired BT device information is a first example of the piece of candidate BT device information. Note even if a BT device already completing the pairing process is a device whose advertising packet is not detected by the wireless communication interface 13 in S22, the OS 18A correlates the first status information with the piece of BT device information of this paired BT device. In other words, the OS 18A correlates the first status information with each piece of BT device information which is not included in any peripheral BT devices detected by the wireless communication interface 13 but which has completed the pairing process once from among the pieces of paired BT device information.

Further, in S24 the OS 18A correlates the second status information to each piece of unpaired BT device information. Thus, the OS 18A generates, as an information set, a second information set including the piece of unpaired BT device information and the second status information. The piece of unpaired BT device information is a second example of the piece of candidate BT device information. The first information set indicates that the pairing process has been completed between the OS 18A and the BT device identified by the piece of paired BT device information. The second information set indicates that the pairing process has not been completed between the OS 18A and the BT device identified by the piece of unpaired BT device information.

In this embodiment, the OS 18A executes S24 for each of the pieces of BT information included in the peripheral devices detected by the wireless communication interface 13 and for each of the pieces of BT information registered in the data area 12B. However, the OS 18A may execute S24 only for each of the pieces of BT information included in the peripheral devices detected by the wireless communication interface 13.

In the embodiment, the first status information indicates that the pairing process has been completed and the second status information indicates that the pairing process has not been completed. However, the first status information may indicate a first state of a BT device and the second status information indicates a second state of the BT device different from the first state. A specific example of the first state is a state where the BT device has settings that permit execution of the pairing process. In this case, the second state is a state where the BT device has settings that prohibit execution of the pairing process. Another example of the first state is a state where the printer 200 as the BT device can execute printing. In this case, the second state is a state where the printer 200 cannot execute printing. Alternatively, the first state is a state where the BT device has settings indicating that the BT device belongs to a specific group. In this case, the second state is a state where the BT device has settings indicating that the BT device does not belong to the specific group. Or, the first status information indicates a first connection state and the second status information indicates a second connection state different from the first connection state.

The information set may not include no status information when the subject BT device has not completed the pairing process. In this case, the program 18B can recognize that the pairing process has not been completed when the information set does not include the first status information. In this case, the second status information may not be defined.

In S25 the OS 18A outputs all the generated information sets to the program 18B. In S25 the program 18B acquires the information sets from the OS 18A and stores the acquired information sets in the data area 12B. Accordingly, the program 18B can acquire each piece of BT identification information identifying the peripheral BT device detected by the wireless communication interface 13. The acquired piece of BT identification information can be classified into one of a plurality types of BT identification information (I)-(IV).

Type (I): A piece of BT identification information included in a BT device that has completed the pairing process with the information-processing device 100 and having specific model information.

Type (II): A piece of BT identification information included in a BT device that has completed the pairing process with the information-processing device 100 and not having specific model information.

Type (III): A piece of BT identification information included in a BT device that has not completed the pairing process with the information-processing device 100 and having specific model information.

Type (IV): A piece of BT identification information included in a BT device that has not completed the pairing process with the information-processing device 100 and not having specific model information.

In S26 the program 18B determines a display style representing the type of BT identification information based on status information and model information for each piece of BT identification information acquired in S25. The display style defines a style or manner by which a piece of BT identification information is displayed so that the user can recognize a type of the piece of BT identification information. In other words, the display style defines a manner to display a piece of BT identification information for representing a type of the piece of BT identification information. The status information and the specific model information are examples of the prescribed information. Specifically, the program 18B determines a display style (1) representing the Type (I) for a piece of BT identification information if the piece of BT identification information is included in the first information set having the first status information, and has specific model information. The program 18B determines a display style (2) representing the Type (II) for a piece of BT identification information if the piece of BT identification information is included in the first information set having the first status information, and does not have specific model information. The program 18B determines a display style (3) representing the Type (III) for a piece of BT identification information if the piece of BT identification information is included in the second information set having the second status information, and has specific model information. The program 18B determines a display style (4) representing the Type (IV) for a piece of BT identification information if the piece of BT identification information is included in the second information set having the second status information, and does not have specific model information. S26 is an example of the first determination process. The display styles (1)-(4) are different from each other. The display styles (1)-(4) are first examples of first through fourth display style.

Each screen displayed on the display 16 will be explained in detail. As a BT device selection screen 32 in the example shown in FIG. 3(B), each screen has a rectangular shape having a side extending from an origin O in a direction 5 and a side extending from the origin O in a direction 6 orthogonal to the direction 5. Specifically, when a display surface of the display 16 is parallel to a vertical direction and faces the user, the origin O is positioned at a left upper corner of each screen seeing from the user, and the direction 5 is a rightward direction and the direction 6 is a downward direction.

Figure 3B:
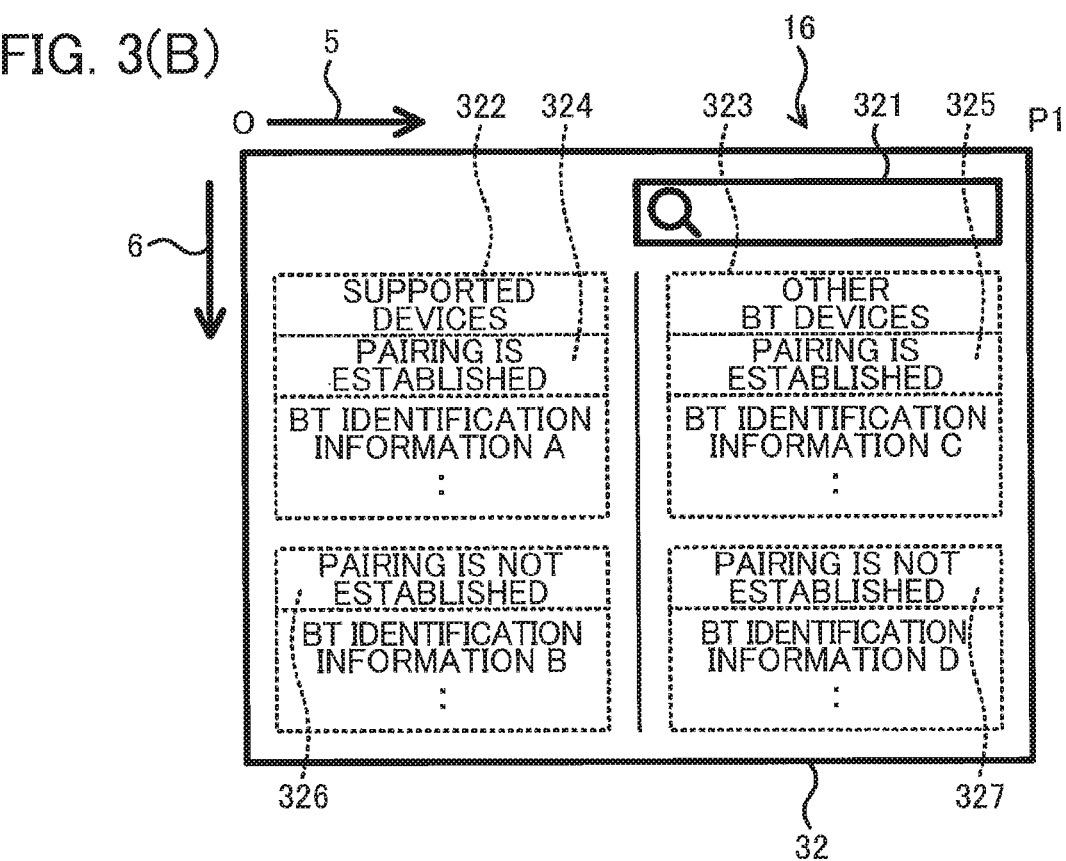
FIG. 3(B)-3(F) are explanatory diagrams illustrating examples of a BT device selection screen.

In S27 of FIG. 4, the program 18B generates display data representing the BT device selection screen 32. As shown in FIG. 3(B), the BT device selection screen 32 includes a search object 321, a plurality of text objects 322-327, and pieces of BT identification information A-D.

The search object 321 is a search box selected by the user who wishes to input keywords. After the user selects the search object 321, the user inputs keywords using the keyboard. The inputted keywords are used as a character string indicating model information when searching. The search object 321 is located near the right upper corner P1 that is apart from the origin O in the direction 5 in the BT device selection screen 32, for example.

Each of the text objects 322-327 includes a character string for indicating a type of the piece of BT identification information. That is, the display styles are implemented by displaying the text objects 322-327 and arranging the pieces of BT device information at areas classified by the text objects 322-327.

The text object 322 includes a character string "Supported BT devices" shown in FIG. 3(B) for indicating that the pieces of BT identification information are included in the type of printers 200 supported by the driver(s) 18C. The text object 323 includes a character string "other BT devices" for indicating that the pieces of BT identification information are included in the type of printers 200 that are supported by none of the drivers 18C. The text objects 322 and 323 are located at downstream side of the search object 321 in the direction 6 in the BT device selection screen 32. The text object 322 is located at a position so that the text object 322 can be firstly recognized by the user among the text objects 322-327. That is, the text object 322 is closest to the origin O than other text objects to the origin O. The text object 323 is located at a position so that the text object 323 is apart from the text object 322 in the direction 5.

Each of the text objects 324 and 325 includes a character string "the pairing is established" for indicating that the pieces of BT identification information included in the BT devices that have completed the pairing process. The text objects 324 and 325 are located downstream side of the text objects 323 and 323 in the direction 6 so that the text objects 324 and 325 are in contact with the text objects 322 and 323 respectively in the BT device selection screen 32.

The program 18B acquires, as a piece of BT identification information A, the piece of BT identification information for which the display style (1) is determined from the data area 12B, and arranges the acquired piece of BT identification information A near and at downstream side of the text object 324 in the direction 6. There is likely that the printer 200 identified by the piece of BT identification information A is set as the target for setup. Thus, the piece of BT identification information A is located at a position closer to the origin O than other BT identification information B-D (described below) to the origin O.

When a plurality of pieces of BT identification information A is acquired, the program 18B arranges the plurality of pieces of BT identification information A in the direction 6 below the text object 324. There are cases where no piece of BT identification information A is acquired and displayed. This holds true for other pieces of BT identification information B-D.

The program 18B acquires, as a piece of BT identification information C, the piece of BT identification information for which the display style (2) is determined from the data area 12B, and arranges the acquired piece of BT identification information C near and at downstream side of the text object 325 in the direction 6.

Each of the text objects 326 and 327 includes a character string "the pairing is not established" indicating that the piece of BT identification information included in the BT device that has not completed the pairing process. The program 18B arranges the text objects 326 and 327 near and at downstream side of the pieces of identification information A and C in the direction 6 respectively in the BT device selection screen 32. The text objects 326 and 327 are arranged adjacent with each other in the direction 5 in the BT device selection screen 32.

The program 18B acquires, as a piece of BT identification information B, the piece of BT identification information for which the display style (3) is determined from the data area 12B, and also acquires, as a piece of BT identification information D, the piece of BT identification information for which the display style (4) is determined from the data area 12B. The program 18B arranges the acquired pieces of BT identification information B and D near and at downstream side of the text objects 326 and 327 in the direction 6 respectively in the BT device selection screen 32.

Each of the pieces of BT identification information is an object that can be selected through user operations. One or more pieces of BT identification information A-D can be selected through the user operations. The pieces of BT identification information C-D may be objects that cannot be selected through user operations.

Figure 3C:
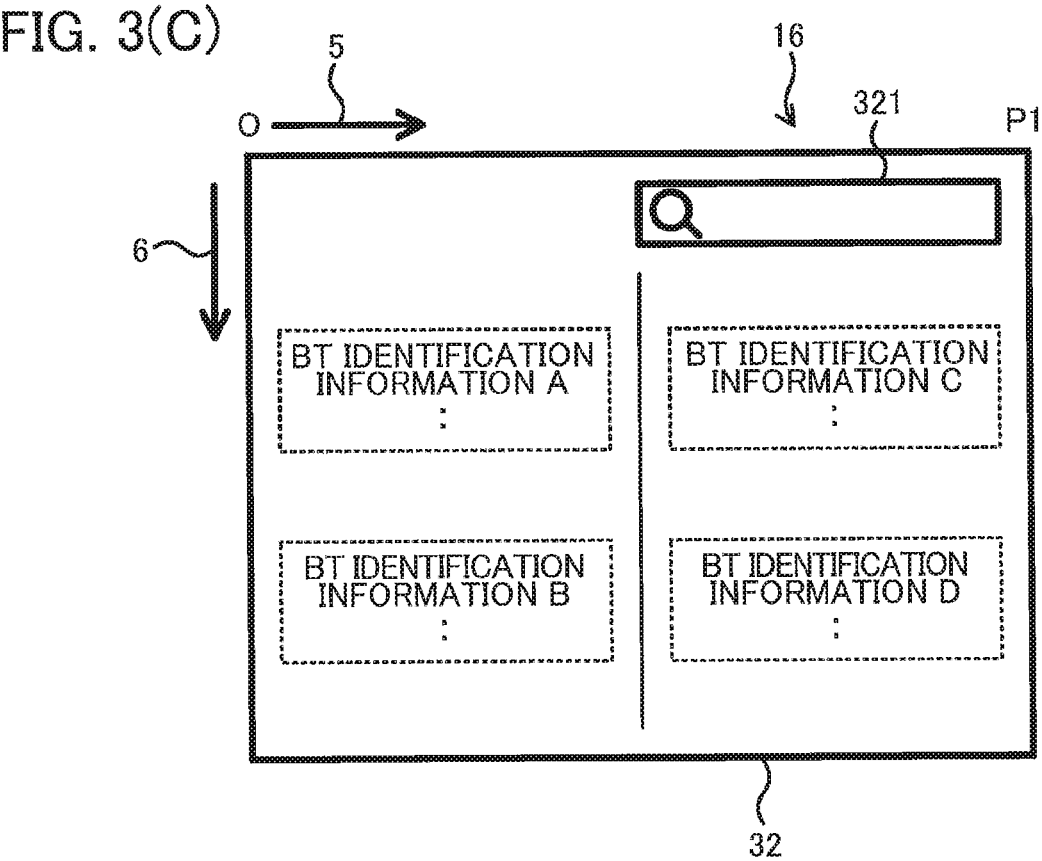

In the above example, the display data represents the BT device selection screen 32 including the text objects 322-327. However, the display data is not limited thereto, and, may represent a BT device selection screen 32 including none of the text objects 322-327 as shown in FIG. 3(C). In this case, the pieces of BT identification information A-D are arranged at areas different from each other in the BT device selection screen 32. That is, the pieces of BT identification information to which the same display style is determined are located in a same area. Thus, the pieces of BT identification information A are separated from other BT identification information B-D. That is, pieces of BT identification information to which the same display style is determined are separated from pieces of BI identification information to which other display styles are determined. Even if the display screen 32 does not include the text objects 322-327, all the pieces of BT identification information acquired in S25 can be displayed on the display 16 according to the determined display styles.

In the above example, one set of display data represents the BT device selection screen 32 including the search object 321 and the pieces of BT identification information A-D. However, two sets of display data may be generated separately. In this case, one set of display data represents a screen including the search object 321, and another set of display data represents a screen including the pieces of BT identification information.

In S28 (FIG. 4) the program 18B starts counting a time. The counted time is a period of time elapsed from start of counting by a timer (not shown). Further, in S28 the program 18B displays the BT device selection screen 32 on the display 16 based on the display data generated in S27. Thus, the program 18B displays the search object 321. In this case, the program 18B displays the text objects 322-327 for implementing the respective display styles determined in S26, and displays a list of pieces of BT identification information acquired in S25. That is, the program 18B displays the pieces of BT identification information A, C, B, D, which are the types (I)-(IV), in the display styles (1)-(4) respectively. The process of S28 is an example of the first display process.

The user can select one or more pieces of BT identification information on the display 16 through user operations. Or, the user can select the search object 321 and input keywords therein. In S28 the program 18B receives such user operations.

In S29 the program 18B determines whether one or more pieces of BT identification information are selected through the user operations. When one or more pieces of BT identification information are selected through the user operations (S29: YES), the program 18B specifies the selected one or more pieces of BT identification information in the data area 12B as pieces of BT identification information for the target printers 200 (hereinafter, referred to as "the pieces of target BT identification information"). Subsequently, the program 18B exits the process shown in FIG. 4 and goes to S111 of FIG. 2. On the other hand, when no BT identification information is selected, the program 18B goes to S210.

In S210 the program 18B determines whether a prescribed time period elapsed from the start of counting based on the counted time. When the prescribed time period does not elapse (S210: NO), the program 18B goes to S211. When the prescribed time period elapses (S210: YES), the program 18B executes S21 again. Note BT devices may change their positions with elapse of time. Thus, after the program 18B executes S21 again if YES determination is made in S210, in S28 the program 18B displays an updated BT device selection screen 32 in accordance with BT devices detected at that time.

In S211 the program 18B determines whether keywords are received in the search object 321 through user operations. When no keyword is received (S211: NO), the process returns to S29. When keywords are received (S211: YES), the program 18B proceeds to S212.

In S212 the program 18B specifies, as one or more pieces of BT identification information E, one or more pieces of BT identification information which are included in the piece of candidate BT device information and related to the inputted keywords. Here, the phrase "related to the inputted keywords" indicates "partial or perfect matching the inputted keywords". The piece of BT identification is determined to partially match the keywords if the keywords are identical with words included in the piece of BT identification information except several letters.

In S213 the program 18B determines a display style (5) representing a type (V) for the one or more pieces of BT identification information E. The one or more pieces of BT identification information determined as the display style (5) are related to the keywords. S212 is an example of the second determination process. The display style (5) is an example of the fifth display style.

Figure 3D:
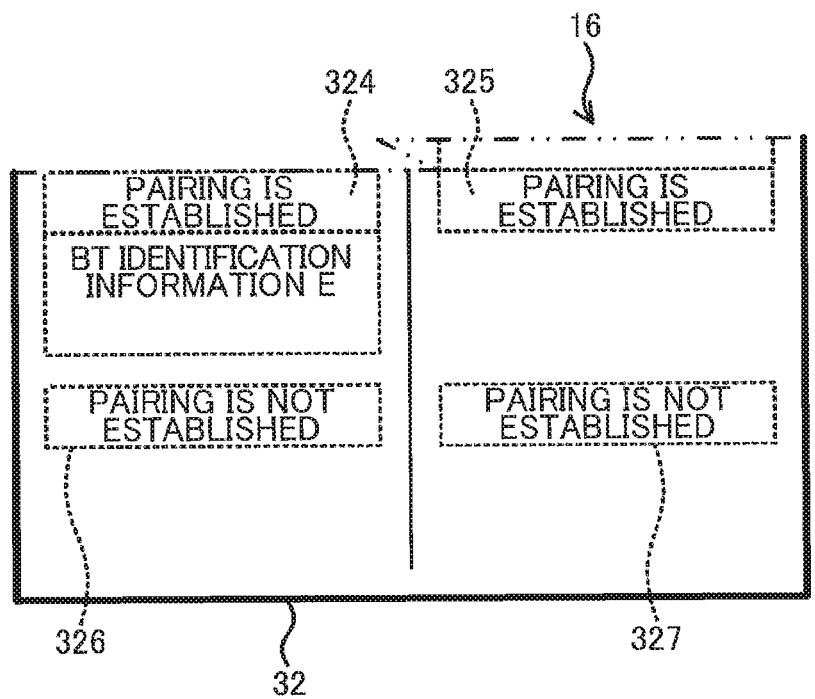

In S214 the program 18B generates display data representing a BT device selection screen 32 (FIG. 3(D)) including only the one or more pieces of BT identification information E specified in S212 according to the display style (5).

In S215 the program 18B resets the counted time by the timer, and restart counting a time. Further, in S215 the program 18B displays the BT device selection screen 32 represented by the display data generated in S214. That is, the program 18B displays the pieces of BT identification information related to the keywords in the display style (5) determined in S213. S215 is an example of the second display process. Subsequently, the program 18B receives user operations for selecting one or more pieces of BT identification information displayed, and executes S29 again based on the received user operations.

Figure 3E:
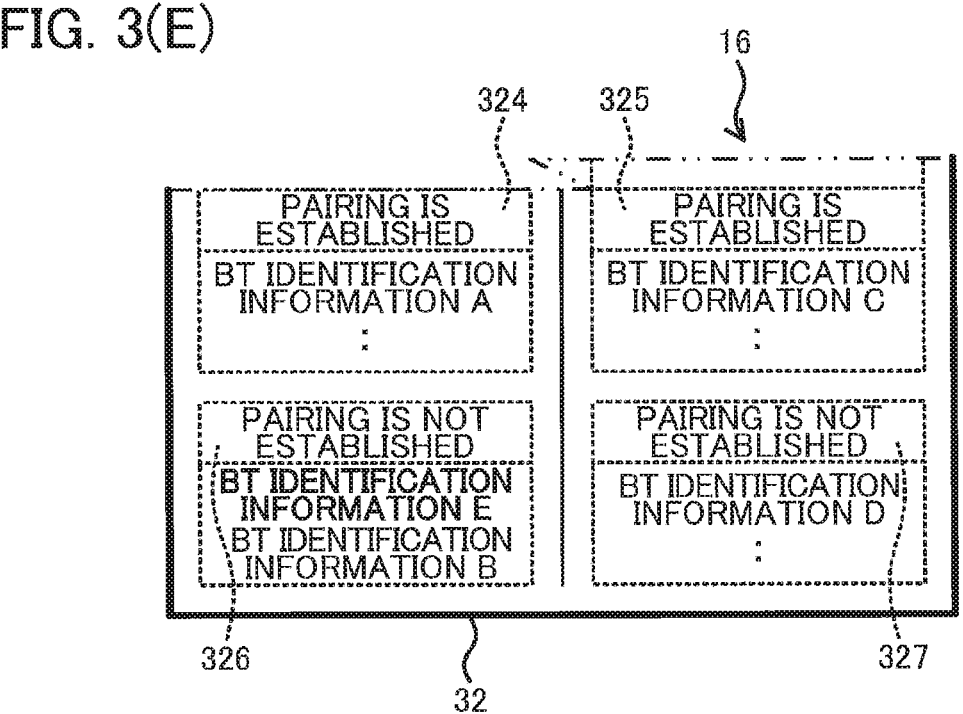
Figure 3F:
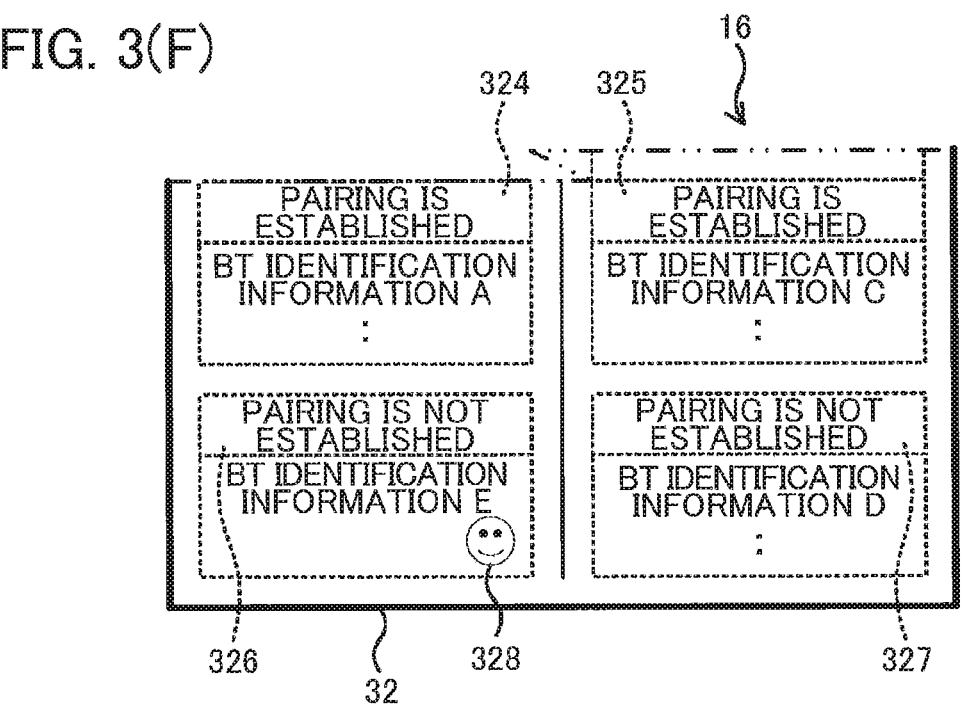

In the above example, the program 18B generates the display data representing the BT device selection screen 32 having only the pieces of BT identification information E in S214. However, in S214 the program 18B may generate display data representing a BT device selection screen 32 including other pieces of BT identification information A-D in addition to the pieces of BT identification information E so that the display style of the pieces of BT identification information E is different from those of the piece of BT identification information A-D. For example, as shown in FIG. 3(E), the display data may represent the pieces of BT identification information E in a shape (more specifically, a size) different from those of the pieces of BT identification information A-D. Alternatively, as shown in FIG. 3(F), objects 328 may be arranged on or near the pieces of BT identification information E. Each object 328 is a drawing or graphical object showing that the piece of BT identification information E is related to the keywords. Accordingly, the user can easily recognize the piece of BT identification information E.

Figure 5A:
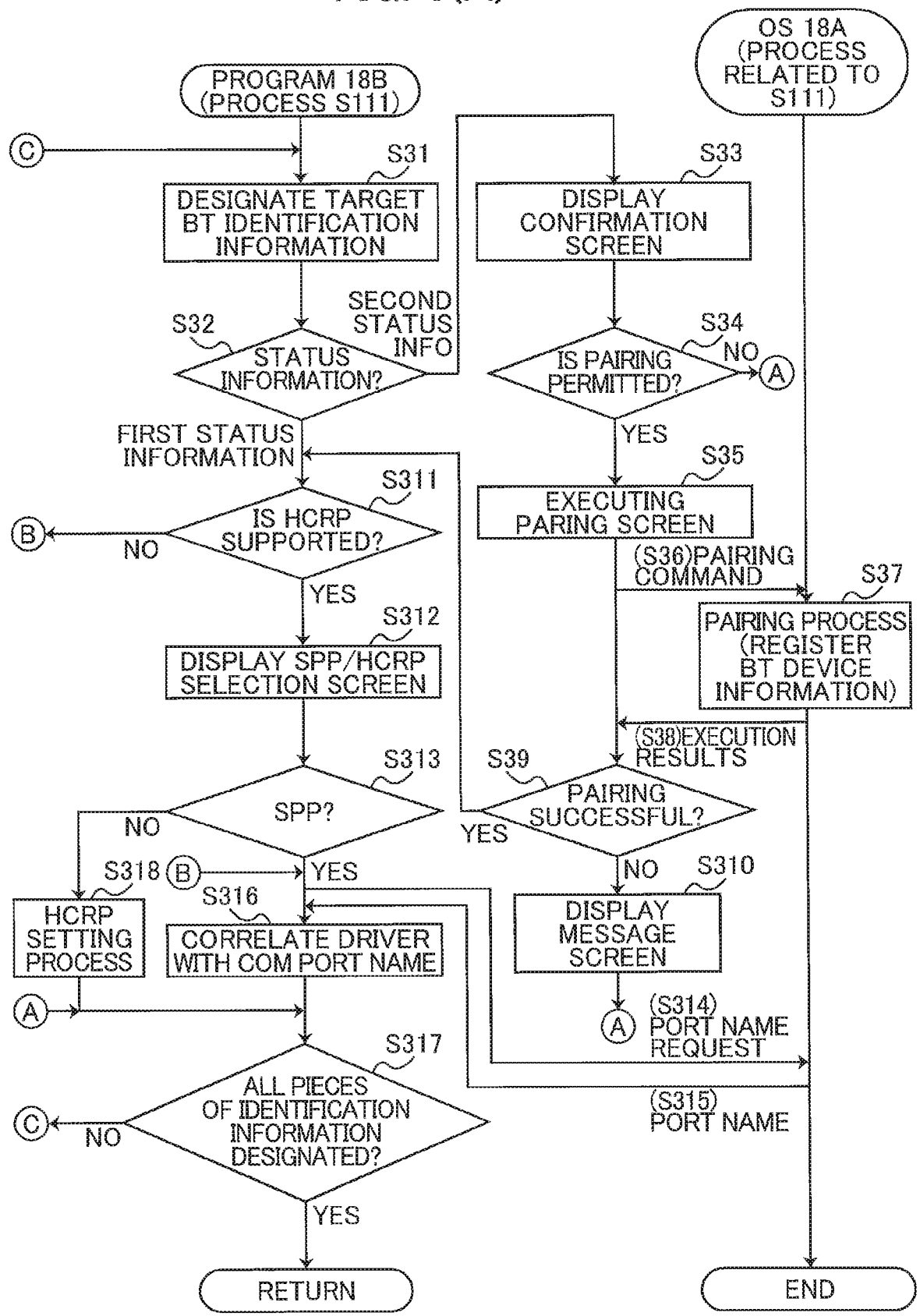
FIG. 5(A) is a flowchart illustrating step S111 shown in FIG. 2 in detail.

After receiving the piece(s) of BT identification information via the user interface 15 in S29 (FIG. 4), in S111 of FIG. 2 the program 18B executes a setup process according to the normal BT setup method. FIG. 5(A) is a flowchart illustrating detailed step of S111.

At the beginning of S31 (FIG. 5(A)), the program 18B has already specified one or more pieces of target BT identification information in the data area 12B (see also S29 of FIG. 4). In S31 the program 18B designates one piece of target BT identification information which has not been designated among the specified one or more pieces of target BT identification information. Hereinafter, the piece of target BT identification information designated in S31 is referred to as "the designated piece of BT identification information", and the target printer 200 indicated by the designated piece of BT identification information is referred to as the designated printer 200. The designated piece of BT identification information is an example of the designated identification information.

In S32 the program 18B determines whether the designated piece of BT identification information is correlated with the first status information or the second status information. When the designated piece of BT identification information is correlated with the first status information (S32: FIRST), the program 18B goes to S311. On the other hand, when the designated piece of BT identification information is correlated with the second status information (S32: SECOND), the program 18B goes to S33. Alternatively, in S32 the program 18B may determine whether a display style determined for the designated piece of BT identification information is a prescribed specific display style. The specific display style is one of the display styles (1) and (2). When the display style is one of the display styles (1) and (2), the program 18B goes to S311, otherwise the program 18B goes to S33. S33 is an example of the determination process.

In S33 the program 18B displays a confirmation screen on the display 16. In the confirmation screen, permission or prohibition of execution of the pairing process can be selected by user operations. S33 is a third example of the second display process. While displaying the confirmation screen, the program 18B receives the user operations. When prohibition of execution of the pairing process is selected through the user operations (S34: NO), the program 18B proceeds to S317. On the other hand, when permission of execution of execution of the pairing process is selected (S34: YES), the program 18B proceeds to S35.

In S35 the program 18B displays an executing pairing screen on the display 16. The executing pairing screen shows that the pairing process is currently executed. In S36 the program 18B outputs a pairing command and the designated piece of BT identification information to the OS 18A so as to instruct the OS 18A to execute the pairing process with the designated printer 200. S36 is an example of the commanding process.

In response to reception of the pairing command, in S37 the OS 18A executes the pairing process with the designated printer 200. Through this pairing process, the OS 18A registers in the data area 12B a piece of paired BT device information for indicating the designated printer 200. The OS 18A generates a wireless communication queue in the data area 12B, and stores first correlation information for correlating the wireless communication queue with the designated printer 200 in the data area 12B.

In S38 the OS 18A outputs execution results that are information for specifying whether the pairing process is successful or not.

The program 18B receives the execution results from the OS 18A, and in S39 determines whether the pairing process is successful based on the received execution results. When the pairing process is successful (S39: YES), the program 18B executes S311. When the pairing process is failed (S39: NO), the program 18B executes S310.

In S310 the program 18B displays a message screen on the display 16. The message screen includes a character string indicating a message to prompting the user to power on the designated printer 200 and to activate the BT function of the designated printer 200. The message screen further includes a character string indicating a message to prompt the user to perform user operations for turning on a BT switch in the OS 18A, and a message to prompt the user to check connection state of an BT antenna provided in the information-processing device 100. Thereafter, the program 18B executes S317.

In the processes from S311 the program 18B sets up the driver 18C so that various commands can be transmitted to the designated printer 200 having the designated piece of BT identification information via the wireless communication interface 13. The series of processes from S311 are an example of the setup process. In a case where the first status information is determined in S32 and thereafter S311 is directly executed, the series of processes executed by the program 18B is an example of the setup process in the first method. In a case where the second status information is determined in S32 and thereafter S311 is executed via S37, the series of processes executed by the program 18B is an example of the setup process in the second method.

In S311 the program 18B determines whether the designated printer 200 supports HCRP. Specifically, the program 18B determines whether the piece of BT device information, which includes the designated piece of BT identification information, includes HCRP. When the HCRP is not included (S311: NO), the program 18B executes S314. When the HCRP is included (S311: YES), the program 18B executes S312.

In S312 the program 18B displays a SPP/HCRP selection screen on the display 16. In S312 is an example of the third display process. In the SPP/HCRP selection screen, either one of SPP and HCRP, as selectable objects, can be selected through user operations. Thus, the program 18B receives the user operations. When the SPP is selected through the user operations (S313: YES), the program 18B executes S314. When the HCRP is selected through the user operations (S313: NO), the program executes S318.

In S314 the program 18B transmits a port name request and the designated piece of BT identification information to the OS 18A. The port name request is for requesting the OS 18A to assign the designated printer 200 to a first communication port so called "COM port" and to return a name of the assigned first communication port (hereinafter, referred to as "the port name") to the program 18B. The port name request includes the designated piece of BT identification information. The first communication port is a serial port.

In response to the port name request received, the OS 18A assigns the designated printer 200 to the first communication port, and registers second correlation information in the data area 12B. The second correlation information is for correlating the assigned first communication port with the piece of BT device information including the designated piece of BT identification information. In S315 the OS 18A outputs the name of the assigned first communication port to the program 18B.

In response to the port name received, in S316 the program 18B specifies a driver 18C that supports the model indicated by the model information in the designated piece of BT identification information and supports the SPP among the drivers 18C stored in the data area 12B in S7. The program 18B registers third correlation information in the data area 12B. The third correlation information is for correlating the specified driver 18C with the acquired port name. The specified driver 18C, the wireless communication queue, the first communication port, and the designated printer 200 are correlated with each other by the first, second, and third correlation information. Accordingly, the information-processing device 100 can transmit various commands (mainly print commands) to the designated printer 200 via the driver 18C supporting the SPP by using the wireless communication queue. The program 18B displays a setup completion screen on the display 16, and thereafter proceeds to S317. The setup completion screen is for notifying that the setup of the driver 18C supporting the SPP has been completed.

In S317 the program 18B determines whether all the pieces of target BT identification information are designated. When all the pieces of target BT identification information are designated (S317: YES), the program 18B displays a setup completion screen on the display 16, and thereafter exits the process of FIG. 5(A) to end the process shown in FIG. 2. The setup completion screen is for notifying that the setup of the driver(s) 18C has been completed. On the other hand, when there remain an undesignated piece of target BT identification information (S317: NO), the program 18B repeats S31. Accordingly, the program 18B executes a setup process of each piece of BT identification information when a plurality of pieces of BT identification information is designated through the user operations in the process of S29 shown in FIG. 4.

In S318 the program 18B executes an HCRP setting process. An HCRP BT communication driver is a standard driver of the OS 18A which acts as a trigger for forced PnP. In the HCRP setting process, the program 18B outputs to the OS 18A a command for setting up the HCRP BT communication driver, and outputs to the OS 18A the piece of BT device information including the designated piece of BT identification information. Based on the command for setting up, the OS 18A assigns a second communication port which is a parallel port to the designated printer 200, specifies a driver 18C supporting a model indicated by the inputted piece of BT device information, and registers fourth correlation information in the data area 12B. The fourth correlation information is for correlating the assigned second communication port with the inputted piece of BT device information and the driver 18C. The driver supporting the HCRP, the wireless communication queue, the second communication port, and the specified printer 200 are correlated with each other by the first and fourth correlation information. Accordingly, the information-processing device 100 can transmit various commands (mainly print commands) to the designated printer 200 via the driver supporting the HCRP by using the wireless communication queue for the designated printer 200. Subsequently, the OS 18A outputs a setup completion notification notifying that setup of the driver supporting the HCRP has been completed to the program 18B. The program 18B displays a setup completion screen on the display 16, and thereafter proceeds to S317. The setup completion screen is for notifying that the setup of the driver supporting the HCRP has been completed.

Figure 6:
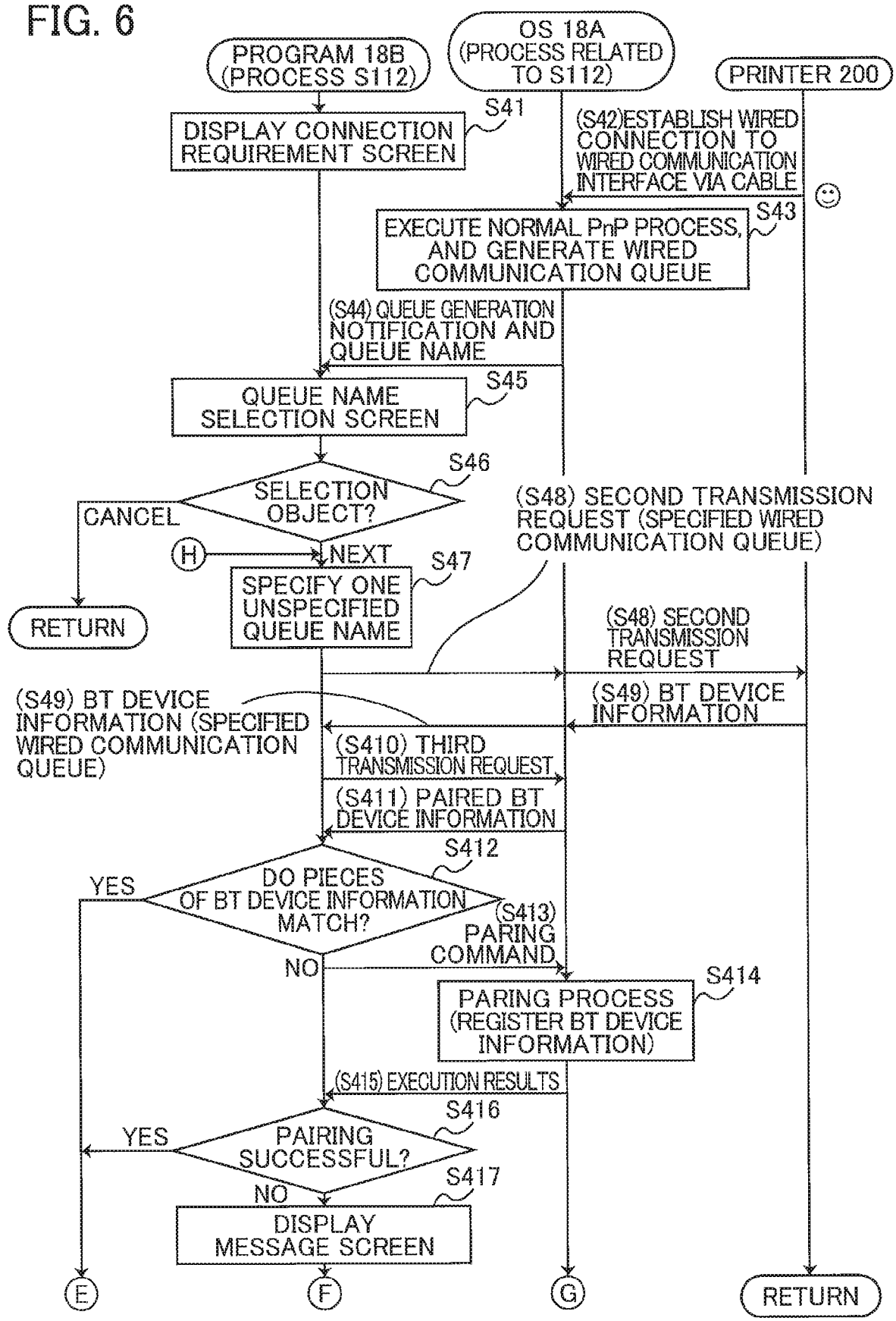
FIG. 6 is a flowchart illustrating step S112 shown in FIG. 2 in detail.

In S112 (FIG. 2) the program 18B executes a process for specifying the target printer 200 and a setup process according to the USB-BT setup method. FIG. 6 is a flowchart illustrating detailed steps of S112.

In S41 of FIG. 6 the program 18B displays a connection requirement screen on the display 16. The connection requirement screen is for requiring the user to connect one or more printers 200 candidate for the BT setup according to the USB-BT setup method (hereinafter, referred to as the candidate printers 200) to the information-processing device 100 by using cables. According to the connection requirement screen, in S42 the user connects the candidate printer 200 to the information-processing device 100 via the communication cable 300. That is, the printer 200 establishes wired connection to the information-processing device 100. The information-processing device 100A can be concurrently connected to a plurality of candidate printers 200 up to the number of connectors provided in the wired communication interface 14.

In response to the wired connection established with an candidate printer 200, in S43 the OS 18A executes a normal PnP process with the candidate printer 200. In the normal PnP process, the OS 18A acquires a USB device descriptor from the candidate printer 200 by the wired communication. The OS 18A extracts a vendor ID and a product ID from the acquired USB device descriptor, and registers the extracted vendor ID and product ID as USB device information in the data area 12B. The OS 18A assigns a third communication port to the candidate printer 200, and registers fifth correlation information in the data area 12B. The fifth correlation information is for correlating the assigned third communication port with the USB device information. Further, in S43 the OS 18A generates a wired communication queue for the candidate printer 200 in the data area 12B. The wired communication queue is a print queue used when the information-processing device 100 transmits various commands (mainly, print commands) to the candidate printer 200 via the communication cable 300. The OS 18A registers sixth correlation information for correlating a queue name with the USB device information of the printer 200 in the data area 12B. The queue name is information indicating a name of the wired communication queue. Each queue name is named based on the corresponding vendor ID and product ID. The third communication port, the queue name of the wired communication queue, and the USB device information identifying the candidate printer 200 are correlated with each other by the fifth and sixth correlation information. Accordingly, the information-processing device 100 can transmit various commands to the candidate printer 200 by using the wired communication queue for the candidate printer 200.

In S44 the OS 18A outputs a queue generation notification together with the queue name to the program 18B. The queue generation notification is for notifying that the wired communication queue is generated for the candidate printer 200.

The OS 18A repeats the processes of S43 and S44 for each candidate printer 200 that establishes wired connection with the information-processing device 100.

Figure 5B:
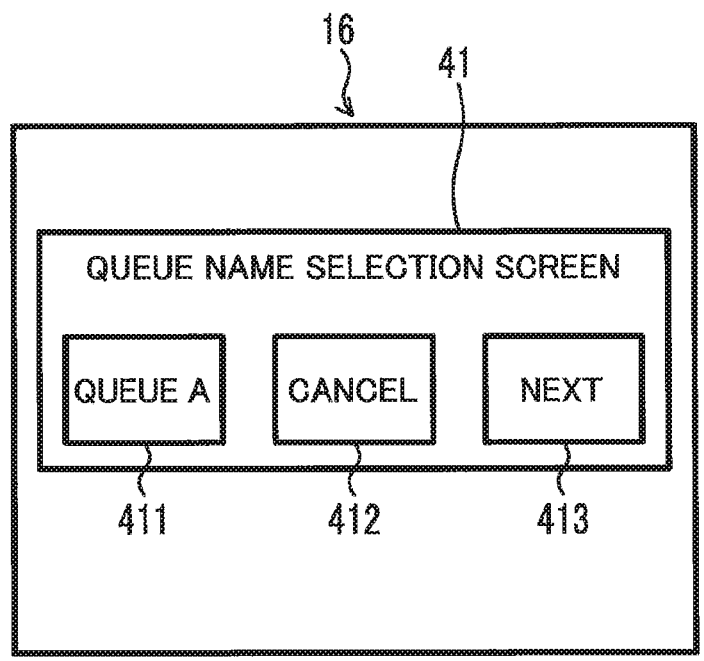
FIG. 5(B) is an explanatory diagram illustrating a queue name selection screen.

In response to reception of the queue generation notification, in S45 the program 18B displays a queue name selection screen 41 shown in FIG. 5(B). The process of S45 is an example of the second display process. The queue name selection screen 41 includes one or more selection objects 411, a selection object 412, and a selection object 413. One selection object 411 is displayed in the example shown in FIG. 5(B). Each selection object 411 corresponds to the queue name acquired in S44. As shown in the example of FIG. 5(B), the selection object 411 includes a character string "queue A" indicating the queue name. The selection object 411 is an example of a third option. The selection object 412 includes a character string "cancel" indicating to cancel the BT setup. The selection object 413 includes a character string "next". The selection object 413 is selected via the user interface 15 in a case where the user wishes to proceed to the setup process. The user selects all the selection objects 411 having the queue names for which the user wishes to proceed to the setup process via the user interface 15, and subsequently operates the selection object 413.

While displaying the queue name selection screen 41, in S45 the program 18B receives user operations. When the selection object 412 is selected thorough the user operations (S46: CANCEL), the program 18B determines that the BT setup is cancelled through the user operations, and exits from the process of FIG. 6 to end the process of FIG. 2. On the other hand, when one or more selection objects 411 and the selection object 413 are selected through user operations (S46: NEXT), the program 18B goes to S47.

In S47 the program 18B specifies, as a specified queue name, one of unspecified queue name(s) corresponding to the selection object(s) 411 selected through the user operations. Hereinafter, the wired communication queue having the specified queue name is referred to as "the specified wired communication queue". The candidate printer 200 corresponding to the specified wired communication queue is referred to as "the specified printer 200".

In S48 the program 18B outputs a second transmission request to the OS 18A. The second transmission request includes the specified queue name, and is for requesting the specified printer 200 to transmit a piece of transmit BT device information to the information-processing device 100. The OS 18A transmits the second transmission request from the wired communication interface 14 to a connector (or a port) specified by the specified wired communication queue. In response to the second transmission request received, the specified printer 200 acquires the piece of BT device information prestored in its memory (not shown). In S49 the specified printer 200 transmits the acquired piece of BT device information to the communication cable 300. The wired communication interface 14 transfers the piece of BT device information transmitted from the communication cable 300 to the specified wired communication queue.

In S49 the OS 18A outputs the piece of BT device information stored in the specified wired communication queue to the program 18B. In response to the piece of BT device information (the piece of BT identification information) received in S49, the program 18B executes S410.

In S410 the program 18B transmits a third transmission request to the OS 18A, and in S411 acquires from the OS 18A all the pieces of paired BT device information that the OS 18A has as a response to the third transmission request.

In S412 the program 18B determines whether the piece of BT device information acquired in S49 matches one of the pieces of paired BT device information acquired in S411. In other words, the program 18B determines whether a wireless communication queue for the BT device including the piece of BT device information acquired in S49 is specified based on the first correlation information by determining whether the piece of BT device information acquired in S49 matches one of the pieces of paired BT device information acquired in S411. When the piece of BT device information acquired in S49 matches none of the pieces of paired BT device information (S412: NO), the program 18B executes S413 for commanding execution of the pairing process since the program 18B cannot specify a wireless communication queue correlated by the first correlation information registered in the pairing process. On the other hand, when the piece of BT device information acquired in S49 matches one of the pieces of paired BT device information (S412: YES), that is, the program 18B specifies a wireless communication queue correlated by the first correlation information, the program 18B executes S418 shown in FIG. 7(A).

In a case where the information-processing device 100 has not completed the pairing process with the specified printer 200, in S413 the program 18B transmits to the OS 18A a pairing command and a piece of BT identification information (hereinafter, referred to as "the specified piece of BT identification information") included in the piece of BT device information acquired in S49. The process of S413 is an example of a commanding process. The program 18B may execute same processes as S33-S35 (FIG. 5(A)) immediately before executing S413.

In response to the pairing command received, in S414 the OS 18A executes the pairing process with the specified printer 200. The process of S414 is the same as that of S37 (FIG. 5(A)) except that the target of the pairing process is the specified printer 200 in S414, and the OS 18A executes the forced PnP process in a case where the specified printer 200 supports the HCRP in S414.

In S415 the OS 18A outputs execution results to the program 18B. The execution results indicate whether the pairing process is successful or not. When the received execution results indicate that the pairing process is successful (S416: YES), the program 18B executes S418 shown in FIG. 7(A). When the received execution results indicate that the pairing process is failed (S416: NO), the program 18B executes S417.

Similarly to S310 (FIG. 5(A)), in S417 the program 18B displays on the display 16 a message screen for prompting the user to power on the specified printer 200 and to activate the BT function of the specified printer 200. The message screen further includes a character string indicating a message to prompt the user to perform user operations for turning on a BT switch in the OS 18A, and a message to prompt the user to check connection state of an BT antenna provided in the information-processing device 100. Subsequently, the program 18B executes S423 shown in FIG. 7(A).

Through the processes from S418, the program 18B sets up the driver 18C so that the information-processing device 100 can transmit various commands to the printer 200 having the specified piece of BT identification information via the wireless communication interface 13 by using the wireless communication queue. The processes from S418, especially the processes of S422 and S424 are an example of the setup process. The processes from S418, in which S418 is directly executed after YES determination of S412 (FIG. 7(A)), is made are an example of the setup process in the first method. The processes from S418, in which S418 is executed via S414 in a case where NO determination of S412 is made, are an example of the setup process in the second method.

Figure 7A:
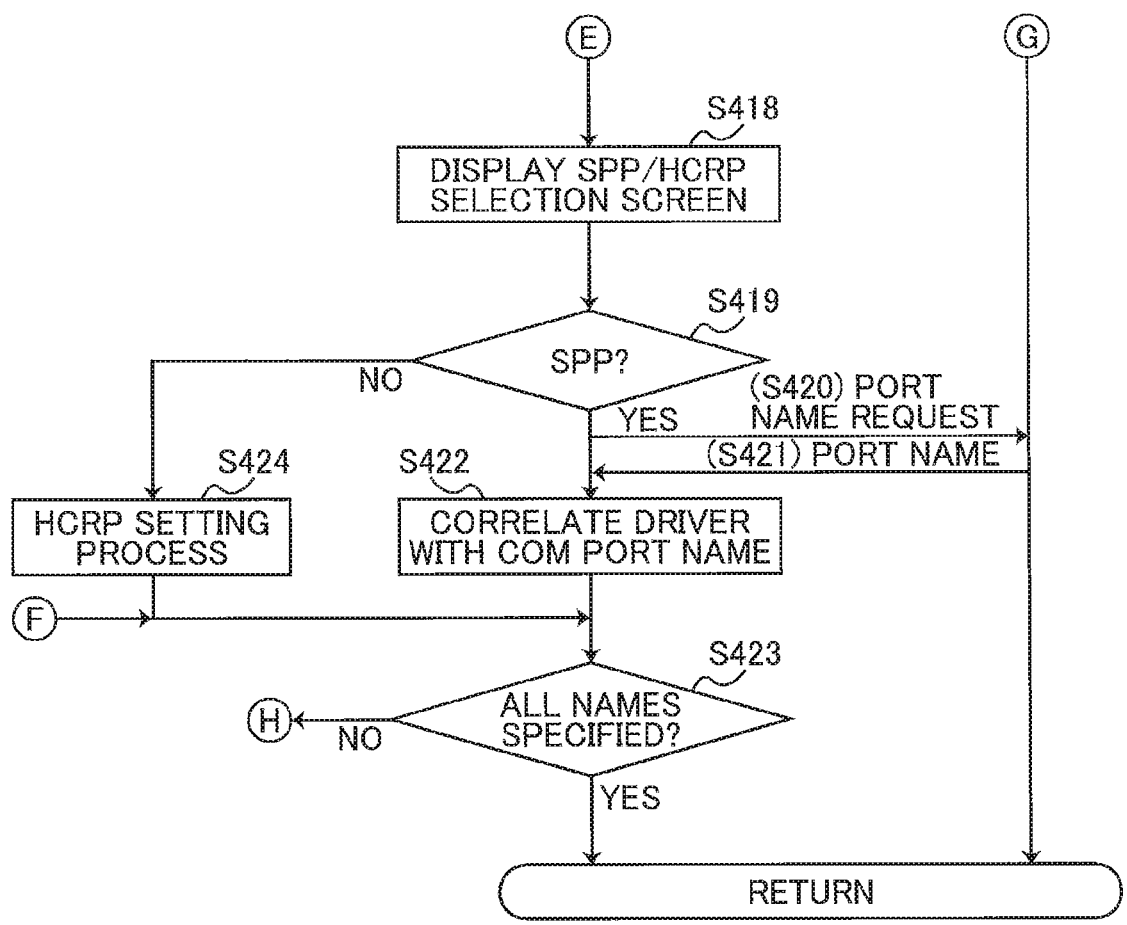
FIG. 7(A) is a flowchart illustrating a process continued from the process shown in FIG. 6.

When the information-processing device 100 has completed the pairing process with the specified printer 200, in S418 (FIG. 7(A)) the program 18B specifies the wireless communication queue correlated with the piece of BT identification information acquired in S49 by the first correlation information registered in the pairing process. Here, in order to execute the setup process correctly, it is preferable to specify the wireless communication queue after confirming that the specified piece of BT identification information includes the specific model information. Further, in S418 the program 18B displays an SPP/HCRP selection screen similarly to S312 (FIG. 5(A)), and subsequently receives user operations. In S419 the program 18B determines whether SPP is selected through user operations. When the SPP is selected (S419: YES), the program 18B executes S420. When SPP is not selected (S420: NO), the program 18B executes S424.

The processes S420-S422 are the same as the processes S314-S316 which are executed according to communications between the program 18B and the OS 18A. Note that wired communications between the program 18B and the OS 18A is used communication in this case. However, wireless communications may be used, or combination of wireless communications and wired communications may be used. Accordingly, the information-processing device 100 can transmit various commands mainly print commands to the specified printer 200 via the driver 18C supporting the SPP.

In S423 the program 18B determines whether all of the queue name(s) corresponding to the selected selection object(s) 411 are specified. When all of the queue name(s) are specified (S423: YES), the program 18B displays the setup completion screen on the display 16, and thereafter exits from the process shown in FIGS. 6 and 7(A) to end the process shown in FIG. 2. On the other hand, when there remains an unspecified queue name (S423: NO), the program 18B repeats S47 (FIG. 6).

In S424 the program 18B executes an HCRP setting process. The HCRP setting process in S424 is the same as that in S318 (FIG. 5(A)) except that in S424 the OS 18A execute the forced PnP process with the specified printer 200. Subsequent to S424, the program 18B executes the process of S423 described above. Note that wired communications between the program 18B and the OS 18A is used in this case. However, wireless communications may be used, or combination of wireless communications and wired communications may be used.

Next, modifications of the embodiment will be described.

[Modification 1]

Figure 8:
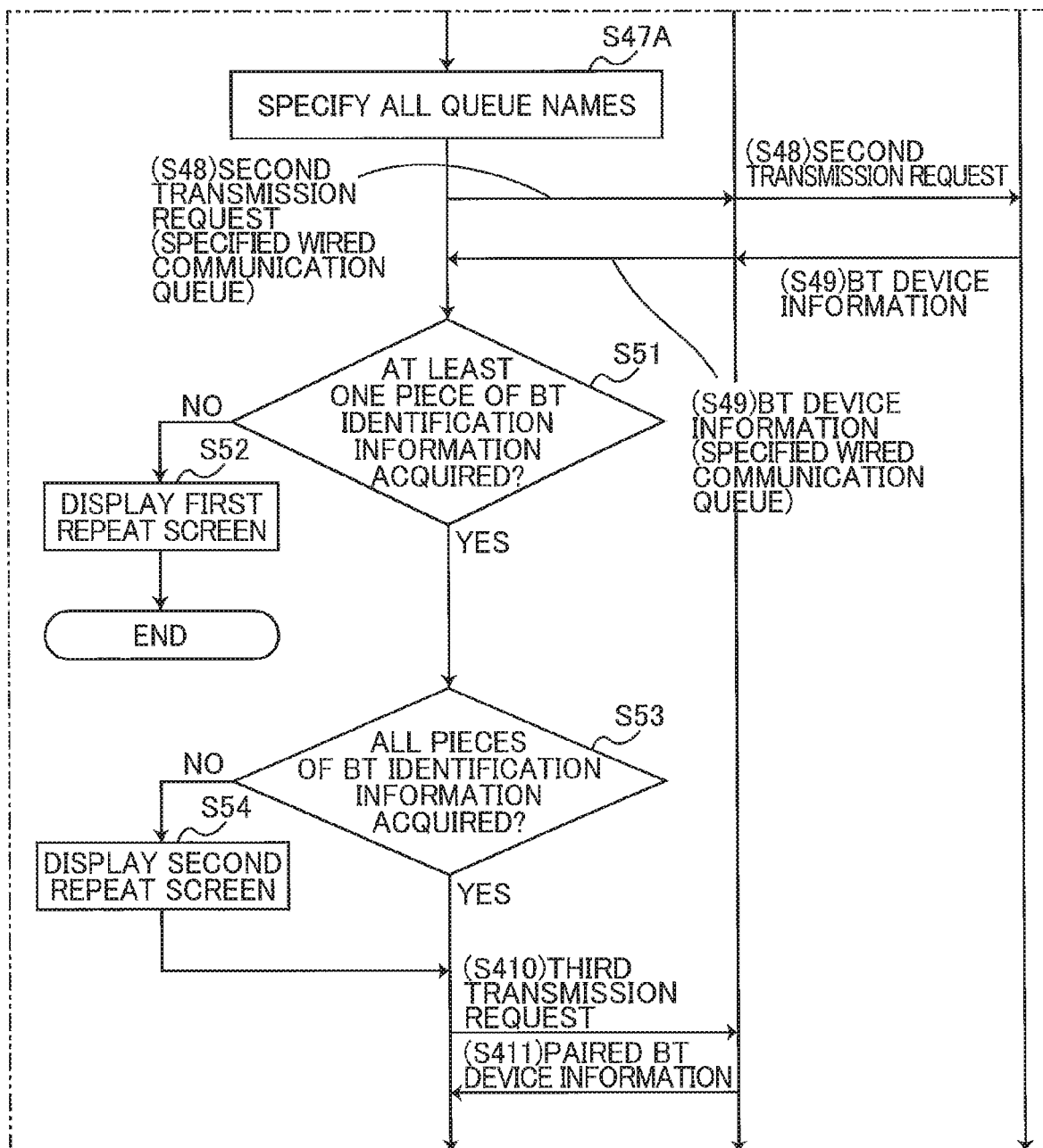
FIG. 8 is a flowchart illustrating step S112 shown in FIG. 2 according to a modification 1.

In the embodiment, the program 18B executes the process shown in FIGS. 6 and 7(A). However, the program 18B executes a modified process of S112 as illustrated in shown in FIG. 8. The modified process of S112 is basically the same as the process shown FIGS. 6 and 7(A) except the following points. That is, step S47A is executed in the process of FIG. 8, instead of executing step S47. Further, the modified process of S112 executes steps S51-S54 between steps S49 and S410. Step S423 (FIG. 7(A)) is not executed in the modified process of S112. The details of the modified process of S112 is described below.

In S47A (FIG. 8) the program 18B specifies, as specified queue names, all of unspecified queue names corresponding to the selection objects 411 selected through the user operations.

In this case steps S48-S49 are repeated for each specified queue names. After S48-S49 are executed for all the specified queue names, the program 18B shifts to S51. Alternatively, in S48 the program 18B transmits the second transmission request to the OS 18A for requesting each specified printer 200 to transmit a piece of transmit BT device information to the information-processing device 100. In this case, the OS 18A receives a piece of BT device information from each specified printer 200 and transmits all the received pieces of BT device information from the program 18B to the program 18B by using the corresponding specified wired communication queues.

After a prescribed period of time has elapsed from execution of S48, in S51 the program 18B determines whether at least one piece of BT identification information is acquired in S49. When no piece of BT identification information is acquired (S51: NO), the program 18B executes S52. When at least one piece of BT identification information is acquired (S51: YES), the program 18B executes S53.

In S52 the program 18B displays a first repeat screen on the display 16. The first repeat screen includes a character string indicating a message to prompt the user to execute the process shown in FIG. 2 over again after connecting each printer 200 to the wired communication interface 14 via a communication cable 300 over again. After S52 is executed, the program 18B exits the process of FIG. 8 and ends the process of FIG. 2.

In S53 the program 18B determines whether all of the pieces of BT identification information corresponding to the selected selection objects 411 are acquired in S49. When at least one piece of BT identification information is not acquired (S53: NO), the program 18B executes S54. When all of the pieces of BT identification information corresponding to the selected selection objects 411 are acquired (S54: YES), the program 18B executes S410.

In S54 the program 18B displays a second repeat screen on the display 16. The second repeat screen includes a character string indicating a message to prompt the user to execute the process shown in FIG. 2 over again after connecting each printer 200, from which the BT identification is not acquired, to the wired communication interface 14 via a communication cable 300 over again. After S54 is executed, the program 18B executes S410.

After executing S54, the program 18B executes S410 and S411 similarly to the embodiment. Subsequently, the program 18B repeatedly executes S412-S424 for each piece of BT device information acquired in S49. That is, either one of S422 and S424 is executed for each specified printer 200 whose BT device information is acquired in S49 for setting up a corresponding driver 18C. After executing either one of S422 and S424 for each specified printer 200, the process of S112 ends without executing S423.

[Modification 2]

In the embodiment, in S26 (FIG. 4) the program 18B determines one of the display styles (1)-(4) for each piece of BT identification information based on status information and model information which are example of the prescribed information. However, the program 18B may determine one of display styles (1A) and (2A). Specifically, the program 18B determines the display style (A) for each piece of BT identification information which is included in a BT device that has completed the pairing process. The program 18B determines the display style (2A) for each piece of BT identification information which is included in a BT device that has not completes the pairing process. The display styles (1A) and (2A) are a second example of the first style and a second example of the second style respectively. In this case, in S28 (FIG. 4) displays a piece of BT identification information corresponding to the first status information in the display style (1A) and a piece of BT identification information corresponding to the second status information in the display style (2A).

[Modification 3]

The program 18B may determine one of display styles (1B) and (2B). Specifically, the program 18B determines the display style (1B) for each piece of BT identification information including specific model information. The program 18B determines the display style (2B) for each piece of the piece of BT identification information not including specific model information. The display styles (1B) and (2B) are third examples of the first style and the second style respectively. In this case, in S28 (FIG. 4) displays BT identification information including the specific model information in the display style (1B) and BT identification information not including specific model information in the display style (2B).

[Modification 4]

Figure 7B:
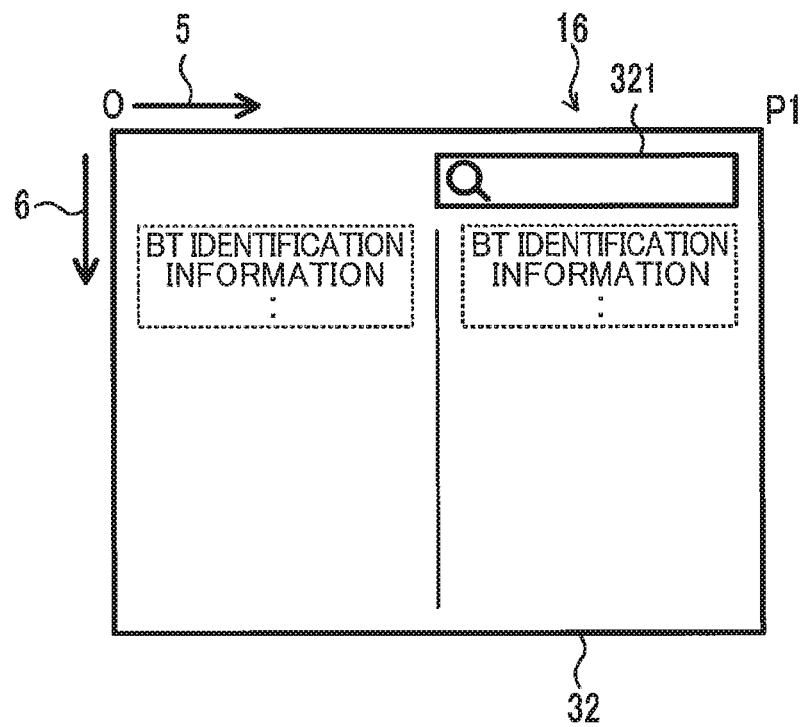
FIGS. 7(B) and 7(C) are explanatory diagrams illustrating examples of a BT device selection screen.

S26 of FIG. 4 may not be executed. In this case, as shown in FIG. 7(B), in S27 the program 18B displays a BT device selection screen 32 including the search object 321 and each piece of BT identification information acquired in S25 without the objects 322-327. In this case, in S213 the program 18B determines the display style (5) for pieces of BT identification information corresponding to keywords designated through user operations by using the search object 321 from among the pieces of BT identification information acquired in S25. Subsequently, the program 18B executes S214 and S215. In this modification, the processes of S213 and S214 are second examples of the first determination process and the first display process respectively. The display style (5) is a fourth example of the first display style.

[Modification 5]

Figure 7C:
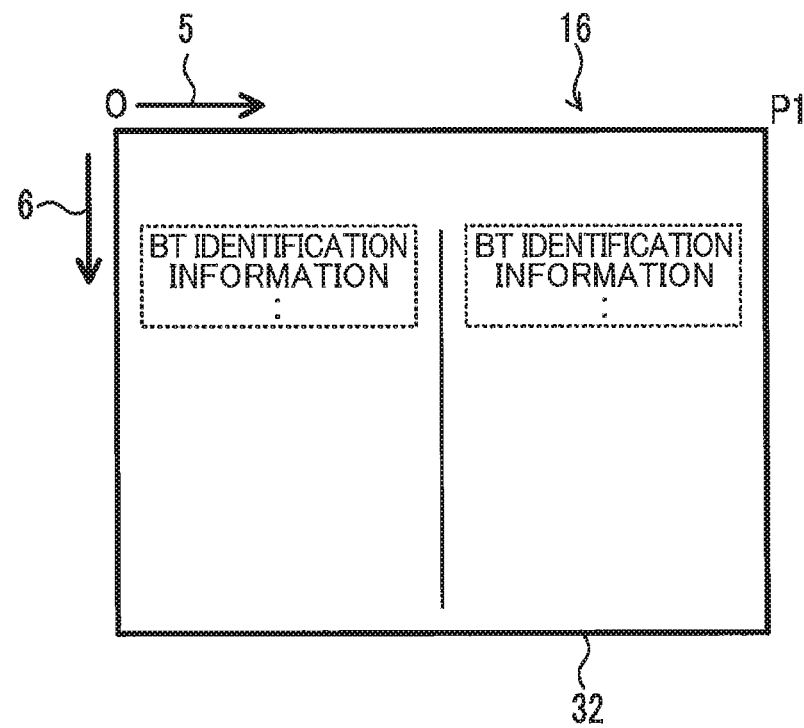

S26 of FIG. 4 may not be executed. In this case, as shown in FIG. 7(C), in S27 the program 18B displays a BT device selection screen 32 including only each piece of BT identification information acquired in S25 without the objects 322-327 and without the search object 321. In this case, in response to selection of one or more pieces of BT identification information via the user interface 15 in S29 (FIG. 4), in S111 (FIG. 2) the program 18B executes the setup process according to the normal BT setup method.

[Modification 6]

In the embodiment, through S21-S25 shown in FIG. 4, the OS 18A transmits the information set in response to the request (the first transmission request) from the program 18B. However, the OS 18A may periodically execute the process of S22-24 to generate information sets, and store the information sets in the data area 12B. In this case, the program 18B acquires the information sets from the data area 12B immediately after the process of FIG. 4 is started.

[Modification 7]

The printer 200 is described as a BT device and a USB device in the embodiment. However, the BT device and the USB device may be a scanner, a digital camera, a 3D printer, a machine tool, or a laser marking machine.

Advantages of the embodiment and the modifications thereof will be described. In executing a process of setup, a conventional information processing device displays a list having pieces of BT identification information for all devices that can establish BT wireless communications including devices other than printers. Further, some type of OSs or some versions of OS displays pieces of identification information supporting wireless communication standards including standards other than BT. Thus, it is difficult for the user to quickly select a piece of BT identification information of the printer target for setup via a user interface.

On the other hand, the program 18B according to the embodiment and the modifications displays the pieces of BT device selection screen 32 on the display 16 (FIG. 3(B)). Specifically, the objects 322-327 are arranged in the BT device selection screen 32, whereby, the pieces of BT identification information are displayed in a classified manner. Accordingly, the user can easily select one of the pieces of BT identification information A-D. That is, the user can easily select a target printer 200 for the setup process.

The user can easily differentiate the piece of BT identification information included in a printer 200 that has completed the pairing process and the piece of BT identification information included in another printer 200 that has not completed the pairing process by the BT device selection screen 32.

Since the BT device selection screen 32 displays the piece of BT identification information E related to keywords specified by the user (see FIG. 3(C)-(E)), the user can easily recognize the piece of BT identification information that the user wishes to select.

The user can easily differentiate the piece of BT identification information included in a printer 200 of the prescribed model and the piece of BT identification information included in another printer 200 of a different model from the prescribed model by the BT device selection screen 32.

In a case where the display style of the piece of target BT identification information is one of the display styles (1) and (2), the program 18B executes the setup in a first method in which the pairing process is not executed. Otherwise, the program 18B executes the setup in a second method in which the pairing process (S37 of FIG. 5) is executed. Accordingly, the program 18B can execute the setup even if the designated piece of BT identification information is not displayed in the display style (1) or (2).

In the conventional technique, the user must perform troublesome operations for targeting the printer that has completed the pairing process for setup. On the other hand, the program 18B according to the embodiment and the modifications acquires the pieces of BT identification information identifying devices that has completed the pairing process and displays these pieces of BT identification information on the display 16. In a case where a piece of BT identification information identifying the device that has completed the pairing process is selected through user operations, the program 18B executes the setup without executing a pairing process once again. Accordingly, the user need not perform troublesome operations for setting up the printer that has completed the pairing process.

In S24 (FIG. 4) the OS 18A correlates the status information with each of the pieces of paired BT device information and pieces of unpaired BT device information. Accordingly, process load of the program 18B can be reduced in the BT setup process.

The OS 18A correlates the status information with the piece of BT device information registered in the data area 12B. The program 18B can set up printers 200 that are not detected by the wireless communication interface 13 as well as detected printers 200.

In S22 of FIG. 4, the OS 18A generates pieces of BT device information in response to the first transmission request received from the program 18B. Accordingly, process load of the program 18B can be reduced in the BT setup process.

The user can easily recognize pieces of BT identification information of the types (I)-(IV) through the BT device selection screen 32.

In S34 (FIG. 5(A)) the program 18B determines whether to execute the pairing process based on user operations through the confirmation screen. Accordingly, execution of the setup process for the printer 200 that is undesired by the user can be restrained.

What is claimed is:

1. A non-transitory computer readable storage medium storing a set of program instructions installed on and executed by an information-processing device having a wireless communication interface, a user interface, a display, a controller, and a memory, the memory storing an OS configured to execute a pairing process to establish a relationship between the OS and an external device for wireless communications via the wireless communication interface, the set of program instructions comprising:

executing a storage process to store a command program in the memory;

executing an acquisition process to acquire a plurality of pieces of identification information identifying respective ones of a plurality of devices detected by the wireless communication interface, each piece of identification information being classified into one of a plurality of types;

executing a determination process to determine a display style among a plurality of display styles different from one another according to prescribed criteria for each of the plurality of pieces of identification information, each display style defining a manner to display the corresponding piece of identification information on the display for representing a type of the corresponding piece of identification information;

executing a display process to display on the display the plurality of pieces of identification information in respective ones of the plurality of display styles determined therefor; and executing a setup process in response to receiving selection of at least a piece of identification information via the user interface from among the plurality of pieces of identification information displayed, the setup process being to enable the command program to output commands to a device identified by each of the selected at least a piece of identification information via the wireless communication interface.

2. The non-transitory computer readable storage medium according to claim 1, wherein the display process includes displaying on the display a list of the plurality of pieces of identification information together with at least one object related to at least one display style.

3. The non-transitory computer readable storage medium according to claim 1, wherein the acquisition process includes acquiring a first information set including first status information and a first piece of identification information identifying a first device, and a second information set including second status information and a second piece of identification information identifying a second device, the first status information indicating that the pairing process has been completed, the second status information indicating that the pairing process has not been completed, wherein the determination process includes determining a first display style for the first piece of identification information that is included in the first information set together with the first status information, and determining a second display style for the second piece of identification information that is included in the second information set together with the second status information, the first display style representing that the pairing process has been completed and the second display style representing that the pairing process has not been completed, wherein the display process includes displaying on the display the first piece of identification information in the determined first display style and the second piece of identification information in the determined second display style.

4. The non-transitory computer readable storage medium according to claim 1, wherein the set of program instructions further comprises an instruction process to instruct the OS to execute the pairing process with a target device in a case where a determined display style for a piece of identification information identifying the target device is not the first display style, wherein the setup process is executed to enable the command program to output commands to the target device in both of a first case and a second case, the first case being a case where the pairing process with the target device has been completed according to the instruction process, the second case being a case where the first display style is determined for the piece of identification information identifying the target device.

5. The non-transitory computer readable storage medium according to claim 1, wherein the display process includes displaying an object for receiving keywords used to search a piece of identification information, wherein the piece of identification information has structure capable of including model information indicating a model of the device,
wherein the set of program instructions further comprises searching at least one piece of identification information related to the keywords received by using the searching object,
wherein the determination process includes determining a specific display style for each piece of identification information that is related to the keywords according to search results,
wherein the display process includes displaying the each piece of identification information related to the keywords in the determined specific display style.

6. The non-transitory computer readable storage medium according to claim 1, wherein the command program is for transmitting commands to one or more specific models of devices,
wherein the determination process includes determining a first display style for each piece of identification information that includes specific model information specifying a specific model among the one or more specific models, and determining a second display style for each piece of identification information that does not include model information specifying any one of the one or more specific models,
wherein the display process includes displaying the each piece of identification information that includes the specific model information in the determined first display style and displaying the each piece of identification information that does not include model information specifying any one of the one or more specific models in the determined second display style.

7. The non-transitory computer readable storage medium according to claim 1, wherein the setup process includes:
setting up the command program in a first method for each piece of identification information whose display style is determined to be a specific display style; and
setting up the command program in a second method different from the first method for each piece of identification information whose display style is determined to be a display style different from the specific display style.

8. The non-transitory computer readable storage medium according to claim 7, wherein the display process includes displaying an object for receiving keywords used to search a piece identification information,
wherein the set of program instructions further comprises:
searching at least one piece of identification information related to the keywords received by using the searching object;
executing a second determination process to determine a third display style for each piece of identification information related to the keywords according to search results; and
executing a second display process to display the each piece of identification information related to the keywords in the determined third display style.

9. The non-transitory computer readable storage medium according to claim 1, wherein the OS registers in the memory a piece of paired-device identification information identifying a device with which the pairing process has been completed, acquires a plurality of pieces of identification information identifying respective ones of a plurality of devices detected by the wireless communication interface, correlates either one of a first status information and a second status information with each of the acquired plurality of pieces of identification information based on the piece of paired-device identification information registered in the memory, the first status information being different from the second status information,
wherein the acquisition process includes at least one of:
acquiring a first information set including the first status information and the piece of identification information that are correlated with each other by the OS; and
acquiring a second information set including the second status information and the piece of identification information that are correlated with each other by the OS.

10. The non-transitory computer readable storage medium according to claim 9, wherein the OS correlates the first status information with an acquired piece of identification information, which matches the piece of paired-device identification information registered in the memory, to generate the first information set.

11. The non-transitory computer readable storage medium according to claim 9, wherein the command program is for transmitting commands to one or more specific models of devices,
wherein the OS correlates the first status information with an acquired piece of identification information, which matches the piece of paired-device identification information registered in the memory and does not include model information specifying any one of the one or more specific models, to generate the first information set.

12. The non-transitory computer readable storage medium according to claim 9, wherein the set of program instructions further comprises transmitting a request to the OS, the request being for requesting the OS to transmit one or more pieces of identification information which the OS detects via the wireless communication interface.

13. The non-transitory computer readable storage medium according to claim 1, wherein in response to receiving selection of at least one of piece of identification information identifying via the user interface, the setup process is executed for a device identified by each of the at least one of piece of identification information.

14. The non-transitory computer readable storage medium according to claim 1, wherein the command program is for transmitting commands to one or more specific models of devices,
wherein the piece of identification information has structure capable of including model information indicating a model of the device,
wherein the acquisition process includes acquiring an information set including status information and a piece of identification information identifying a device, the status information being one of first status information and second status information, the first status information indicating that the pairing process has been completed, the second status information indicating that the pairing process has not been completed,
wherein the determination process includes determining one of a first display style, a second display style, a third display style, and a fourth display style for each acquired piece of identification information based on at least one of model information and status information which are included in the each acquired information set,
wherein the first display style indicates that a piece of identification information identifies a device having completed the pairing process and includes specific model information specifying a specific model among the one or more specific models of devices,
wherein the second display style indicates that a piece of identification information identifies a device not having completed the pairing process and includes the specific model information,
wherein the third display style indicates that a piece of identification information identifies a device having completed the pairing process and does not include model information specifying any one of the one or more specific models,
wherein the fourth display style indicates that a piece of identification information identifies a device not having completed the pairing process and does not include model information specifying any one of the one or more specific models,
wherein the display process includes:
  displaying in the determined first display style each piece of identification information that includes the specific model information and is correlated with the first status information;
  displaying in the determined second display style each piece of identification information that includes the specific model information and is correlated with the second status information;
  displaying in the determined third display style each piece of identification information that does not include model information specifying any one of the one or more specific models and is correlated with the first status information; and
  displaying in the determined fourth display style each piece of identification information that does not include model information specifying any one of the one or more specific models and is correlated with the second status information.

15. The non-transitory computer readable storage medium according to claim 14, wherein the display process includes displaying an object for receiving keywords used to search a piece of identification information,
wherein the set of program instructions further comprises:
  searching at least one piece of identification information related to the keywords received by using the searching object;
  executing a second determination process to determine a fifth display style for each piece of identification information related to the keywords according to search results; and
  executing a second display process to display the each piece of identification information related to the keywords according to the search results in the determined fifth display style.

16. A non-transitory computer readable storage medium storing a set of program instructions installed on and executed by an information-processing device having a wireless communication interface, a user interface, a controller, and a memory, the memory storing an OS configured to execute a pairing process to establish a relationship between the OS and an external device for wireless communications via the wireless communication interface, the set of program instructions comprising:
  executing a storage process to store a command program in the memory;
  executing an acquisition process to acquire a piece of identification information and status information, the piece of identification information identifying a device, the status information indicating either one of a first status of a device identified by the piece of identification information and a second status of the device, the second status being different from the first status;
  executing a determination process to determine whether the status information indicates the first status or the second status;
  executing a setup process according to a first method in a case where the status information indicates the first status, the setup process being to enable the command program to output commands via the wireless communication interface to the device identified by the piece of identification information; and
  executing a setup process according to a second method different from the first method in a case where the status information indicates the second status.

17. The non-transitory computer readable storage medium according to claim 16, wherein the first status indicates a first state of connection between the device and the information-processing device, the second status indicates a second state of connection between the device and the information-processing device different from the first state of connection.

18. The non-transitory computer readable storage medium according to claim 17, wherein the first state of connection indicates that the OS has completed the pairing process with the device whereas the second state of connection indicates that the OS has not completed the pairing process with the device,
wherein in the setup process according to the second method includes instructing the OS to execute the pairing process with the device before enabling the command program to output via the wireless communication interface,
wherein the setup process according to the first method enables the command program to output via the wireless communication interface without instructing the OS to execute the pairing process with the device.

19. The non-transitory computer readable storage medium according to claim 16, wherein the acquisition process includes acquiring a plurality of information sets, each information sets including status information and a piece of identification information identifying a device, each piece of identification information being classified into one of a plurality of types,
wherein the set of program instructions comprises:
  executing a second determination process to determine a display style among a plurality of display styles for each piece of identification information included in the plurality of information sets acquired based on a type of the piece of identification information, each display style defining a manner to display the corresponding piece of identification information on the display for representing a type of the corresponding piece of identification information; and
  executing a display process to display on the display the plurality of pieces of identification information in respective ones of the plurality of display styles determined therefor to receive selection of at least one piece of identification information among the plurality of pieces of identification information displayed,
wherein in response to receiving selection of the at least one piece of identification information among the plurality of pieces of identification information displayed, the determination process determines whether status information included in an information set including the selected piece of identification information indicates the first status or the second status.

20. The non-transitory computer readable storage medium according to claim 18, wherein the OS registers in the memory a piece of paired-device identification information identifying a device with which the pairing process has been completed, acquires a plurality of pieces of identification information identifying devices detected by the wireless communication interface, and correlates status information with each of the acquired plurality of pieces of identification information based on the piece of paired-device identification information registered in the memory,
 wherein the acquisition process includes acquiring a plurality of information sets, each information set including status information and a piece of identification information which are correlated by the OS.

21. The non-transitory computer readable storage medium according to claim 19, wherein the OS correlates each acquired piece of identification information, which matches the piece of paired-identification information registered in the memory, with the first status information.

22. The non-transitory computer readable storage medium according to claim 21, wherein the command program is for transmitting commands to one or more specific models of devices,
 wherein the OS correlates the first status information with an acquired piece of identification information, which matches the piece of paired-device identification information registered in the memory and does not include model information specifying any one of the one or more specific models, to generate the first information set.

23. The non-transitory computer readable storage medium according to claim 18, wherein in response to determining that the status information indicates the second state of connection, executing a second display process to display a selection object for obtaining permission to execute the pairing process with the device,
 wherein the instructing is executed in response to receiving selection of the selection object.

24. An information-processing device comprising:
 a wireless communication interface;
 a user interface;
 a display;
 a memory storing an OS configured to execute a pairing process to establish a relationship between the OS and an external device for wireless communications via the wireless communication interface; and
 a controller configured to execute:
  a storage process to store a command program in the memory;
  an acquisition process to acquire a plurality of pieces of identification information identifying respective ones of a plurality of devices detected by the wireless communication interface, each piece of identification information being classified into one of a plurality of types;
  a determination process to determine a display style among a plurality of display styles different from one another according to prescribed criteria for each of the plurality of pieces of identification information, each display style defining a manner to display the corresponding piece of identification information on the display for representing a type of the corresponding piece of identification information;
  a display process to display on the display the plurality of pieces of identification information in respective ones of the plurality of display styles determined therefor; and
  a setup process in response to receiving selection of at least a piece of identification information via the user interface from among the plurality of pieces of identification information displayed, the setup process being to enable the command program to output commands to a device identified by each of the selected at least a piece of identification information via the wireless communication interface.

25. An information-processing device comprising:
 a wireless communication interface;
 a user interface;
 a memory storing an OS configured to execute a pairing process to establish a relationship between the OS and an external device for wireless communications via the wireless communication interface; and
 a controller configured to execute:
  a storage process to store a command program in the memory;
  an acquisition process to acquire a piece of identification information and status information, the piece of identification information identifying a device, the status information indicating either one of a first status of a device identified by the piece of identification information and a second status of the device, the second status being different from the first status;
  a determination process to determine whether the status information indicates the first status or the second status;
  a setup process according to a first method in a case where the status information indicates the first status, the setup process being to enable the command program to output commands via the wireless communication interface to the device identified by the piece of identification information; and
  a setup process according to a second method different from the first method in a case where the status information indicates the second status.

* * * * *